US012136774B2

(12) United States Patent
Spink et al.

(10) Patent No.: US 12,136,774 B2
(45) Date of Patent: Nov. 5, 2024

(54) ELECTROMAGNETIC DEVICE AND METHOD OF MAKING SAME

(71) Applicant: ROGERS CORPORATION, Chandler, AZ (US)

(72) Inventors: Jared K. Spink, Scottsdale, AZ (US); William Blasius, Charlton, MA (US); Sergio Clavijo, Phoenix, AZ (US); Kristi Pance, Newton, MA (US)

(73) Assignee: ROGERS CORPORATION, Chandler, AZ (US)

( * ) Notice: Subject to any disclaimer, the term of this patent is extended or adjusted under 35 U.S.C. 154(b) by 33 days.

(21) Appl. No.: 17/545,204

(22) Filed: Dec. 8, 2021

(65) Prior Publication Data

US 2022/0181783 A1 Jun. 9, 2022

Related U.S. Application Data

(60) Provisional application No. 63/123,249, filed on Dec. 9, 2020.

(51) Int. Cl.
*H01Q 9/04* (2006.01)
*H01Q 1/36* (2006.01)
(Continued)

(52) U.S. Cl.
CPC ............. *H01Q 9/0485* (2013.01); *H01Q 1/36* (2013.01); *H01Q 15/08* (2013.01); *H01Q 19/06* (2013.01); *H01Q 21/064* (2013.01); *H01Q 21/20* (2013.01)

(58) Field of Classification Search
CPC ...... H01Q 1/36; H01Q 9/0485; H01Q 9/0492; H01Q 13/06; H01Q 15/02; H01Q 15/04;
(Continued)

(56) References Cited

U.S. PATENT DOCUMENTS 5,952,972 A * 9/1999 Ittipiboon ............ H01Q 9/0485 343/873
6,198,450 B1 3/2001 Adachi et al.
(Continued)

FOREIGN PATENT DOCUMENTS

CN 111900542 A 11/2020
JP 2000101314 * 9/1998
(Continued)

OTHER PUBLICATIONS

International Search Report mailed Apr. 14, 2022; International Application No. PCT/US2021/062543; International Filing Date Dec. 9, 2021 (5 pgs).

(Continued)

*Primary Examiner* — Robert Karacsony
(74) *Attorney, Agent, or Firm* — CANTOR COLBURN LLP

(57) ABSTRACT

An electromagnetic, EM, device, includes: a three-dimensional, 3D, body having a dielectric material, the 3D body having a first dielectric portion, 1DP, and a second dielectric portion, 2DP, wherein the 1DP is at least partially but not completely embedded within the 2DP; wherein the 1DP and the 2DP each have a dielectric material other than air; wherein the 1DP and the 2DP each have a planar cross-section profile perpendicular to a particular linear axis of the 3D body that is constant along the particular linear axis; wherein at least a portion of the 3D body is a dielectric resonator, DR.

19 Claims, 26 Drawing Sheets

(51) Int. Cl.

| | |
|---|---|
| ***H01Q 15/08*** | (2006.01) |
| ***H01Q 19/06*** | (2006.01) |
| ***H01Q 21/06*** | (2006.01) |
| ***H01Q 21/20*** | (2006.01) |

(58) Field of Classification Search

CPC .... H01Q 15/08; H01Q 19/06; H01Q 21/0031; H01Q 21/0037; H01Q 21/0043; H01Q 21/005; H01Q 21/0056; H01Q 21/06; H01Q 21/061; H01Q 21/064

See application file for complete search history.

(56) References Cited

U.S. PATENT DOCUMENTS

| | | | |
|---|---|---|---|
| 9,472,840 | B2 | 10/2016 | Herbsommer et al. |
| 10,476,164 | B2 | 11/2019 | Pance et al. |
| 10,522,917 | B2 | 12/2019 | Pance et al. |
| 10,587,039 | B2 | 3/2020 | Pance et al. |
| 10,601,137 | B2 | 3/2020 | Pance et al. |
| 10,700,434 | B2 | 6/2020 | Pance et al. |
| 10,700,435 | B2 | 6/2020 | Pance et al. |
| 2017/0125910 | A1 | 5/2017 | Pance et al. |

FOREIGN PATENT DOCUMENTS

| | | | |
|---|---|---|---|
| JP | 2000101314 | A | 4/2000 |
| WO | 2004017461 | A1 | 2/2004 |
| WO | 2013025090 | A1 | 2/2013 |
| WO | 2014159450 | A1 | 10/2014 |
| WO | 2018063342 | A1 | 4/2018 |

OTHER PUBLICATIONS

Written Opinion mailed Nov. 16, 2022; International Application No. PCT/US2021/062543; International Filing Date Dec. 9, 2021 (8 pgs).

Written Opinion mailed Apr. 14, 2022; International Application No. PCT/US2021/062543; International Filing Date Dec. 9, 2021 (11 pgs).

Guo, et al., Wide-Band Stacked Double Annular-Ring Dielectric Resonator Antenna at the End-Fire Mode Operation, IEEE Transactions on Antennas and Propagation, vol. 53, No. 10, Oct. 2005 (3394-3397).

International Preliminary Report On Patentability mailed Mar. 23, 2023; International Application No. PCT/US2021/062543; International Filing Date Dec. 9, 2021 (10 pgs).

* cited by examiner

ELECTROMAGNETIC DEVICE AND METHOD OF MAKING SAME

CROSS REFERENCE TO RELATED APPLICATIONS

This application claims the benefit of U.S. Provisional Application Ser. No. 63/123,249, filed Dec. 9, 2020, which is incorporated herein by reference in its entirety.

BACKGROUND

The present disclosure relates generally to an electromagnetic, EM, device and method of making the same, and particularly to an EM device having a three dimensional, 3D, body having two or more dielectric portions and planar cross section profiles of the two or more dielectric portions that are constant along a particular linear direction.

Known dielectric EM devices that serve as dielectric resonators can be found in commonly assigned U.S. Pat. Nos. 10,476,164; 10,522,917; 10,587,039; 10,601,137; 10,700,434; 10,700435.

While existing dielectric EM devices may be suitable for their intended purpose, the art relating to dielectric EM devices would be advanced with a structure that can be more easily fabricated.

BRIEF SUMMARY

In an embodiment, an electromagnetic, EM, device, includes: a three-dimensional, 3D, body having a dielectric material, the 3D body having a first dielectric portion, 1DP, and a second dielectric portion, 2DP, wherein the 1DP is at least partially but not completely embedded within the 2DP; wherein the 1DP and the 2DP each have a dielectric material other than air; wherein the 1DP and the 2DP each have a planar cross-section profile perpendicular to a particular linear axis of the 3D body that is constant along the particular linear axis; wherein at least a portion of the 3D body is a dielectric resonator, DR.

In an embodiment, an electromagnetic, EM, device, includes: a three-dimensional, 3D, body having a dielectric material, the 3D body having a first dielectric portion, 1DP, and a second dielectric portion, 2DP, the 2DP being disposed on top of the 1DP relative to a z-axis of an orthogonal x-y-z coordinate system; wherein the 3D body has a y-z plane cross-section profile that is perpendicular to and constant along the x-axis of the 3D body.

In an embodiment, an electromagnetic, EM, device, includes: a three-dimensional, 3D, body having a dielectric material, the 3D body having a first dielectric portion, 1DP, and a second dielectric portion, 2DP, the 2DP being disposed radially outboard of the 1DP relative to a radius r of a cylindrical r-θ-z coordinate system; wherein the 3D body has an r-θ plane cross-section profile that is perpendicular to and constant along the z-axis of the 3D body.

In an embodiment, an electromagnetic, EM, device, includes: a three-dimensional, 3D, body having a plurality of layers of dielectric materials, each layer of the plurality of layers being disposed adjacent and in contact with another one of the plurality of layers, each layer of the plurality of layers being disposed parallel to an x-y plane of an orthogonal x-y-z coordinate system and being stacked relative to each other along the associated z-axis; wherein each layer of the plurality of layers has a dielectric material other than air; wherein each layer of the plurality of layers has a planar cross-section profile perpendicular to at least one of the x-axis and the y-axis that is constant along the respective x or y-axis; wherein the 3D body has a 3D shape having an overall height dimension H, an overall width dimension W, and an overall thickness dimension T, a front profile view of the 3D body being defined by dimensions H and W; wherein at least one layer of the plurality of layers is a dielectric resonator, DR.

The above features and advantages and other features and advantages of the invention are readily apparent from the following detailed description of the invention when taken in connection with the accompanying drawings.

BRIEF DESCRIPTION OF THE DRAWINGS

Referring to the exemplary non-limiting drawings wherein like elements are numbered alike in the accompanying Figures.

Figure 1A:
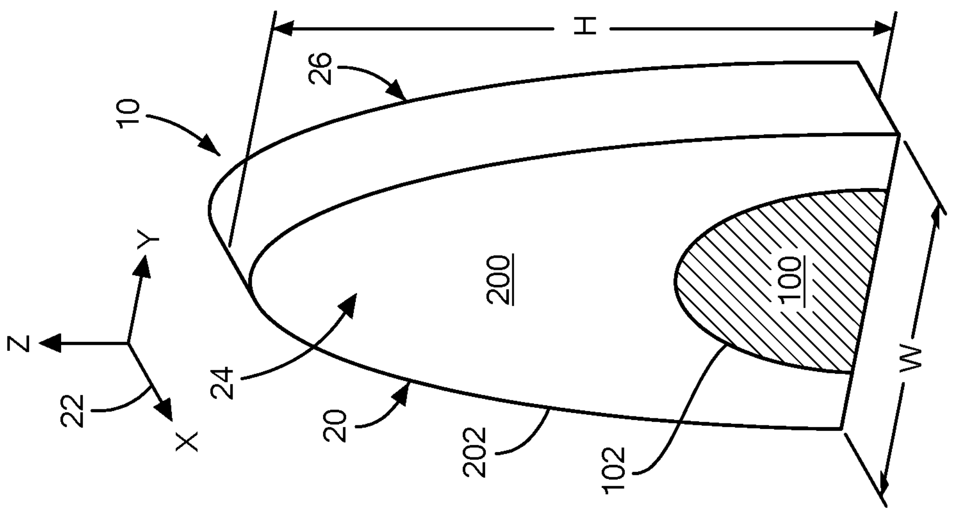
FIGS. 1A, 1B and 1C, each depict a rotated isometric view of an EM device having three-dimensional, 3D, body composed of a dielectric material, in accordance with an embodiment.

One skilled in the art will understand the drawings, described herein below, are for illustration purposes only. It will be appreciated that for simplicity and clarity of illustration, elements shown in the figures have not necessarily been drawn to scale. For example, the dimensions or scale of some of the elements may be exaggerated relative to other elements for clarity. Further, where considered appropriate, reference numerals may be repeated among the figures to indicate corresponding or analogous elements, or analogous elements may not be repetitively enumerated in all figures.

DETAILED DESCRIPTION

As used herein, the phrase "embodiment" means an "embodiment disclosed and/or illustrated herein", which may not necessarily encompass a specific embodiment of an invention in accordance with the appended claims, but nonetheless is provided herein as being useful for a complete understanding of an invention in accordance with the appended claims.

Although the following detailed description contains many specifics for the purposes of illustration, anyone of ordinary skill in the art will appreciate that many variations and alterations to the following details are within the scope of the appended claims. For example, where described features may not be mutually exclusive of and with respect to other described features, such combinations of non-mutually exclusive features are considered to be inherently disclosed herein. Additionally, common features may be commonly illustrated in the various figures but may not be specifically enumerated in all figures for simplicity, but would be recognized by one skilled in the art as being an explicitly disclosed feature even though it may not be enumerated in a particular figure. Accordingly, the following example embodiments are set forth without any loss of generality to, and without imposing limitations upon, the claimed invention disclosed herein and presented in the appended claims.

Figure 1B:
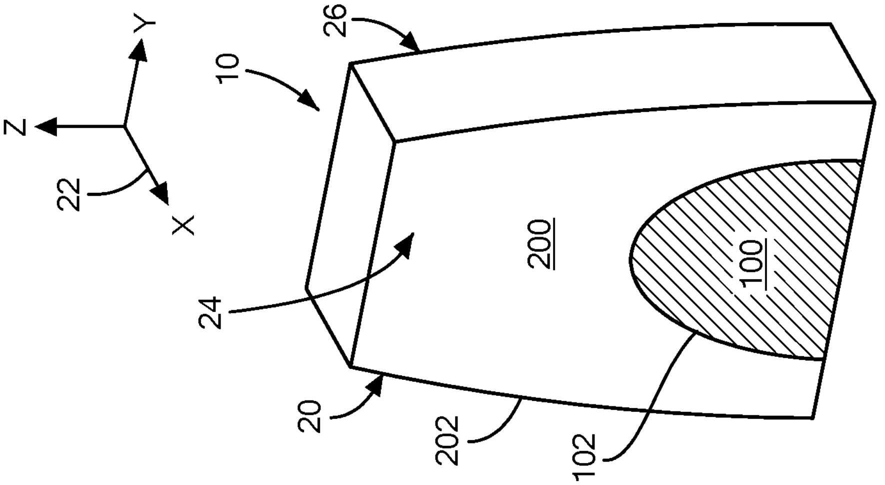
Figure 1C:
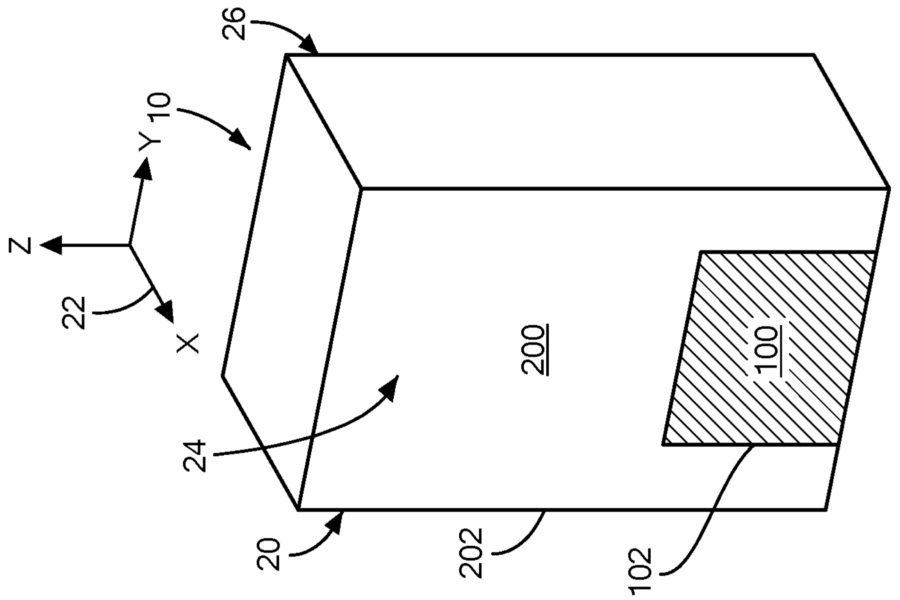

With reference generally to FIGS. 1A-1C, an embodiment as shown and described by the various figures and accompanying text, provides an electromagnetic, EM, device 10, having: a three-dimensional, 3D, body 20 composed of a dielectric material, the 3D body 20 having a first dielectric portion, 1DP 100, and a second dielectric portion, 2DP 200, wherein the 1DP 100 is at least partially but not completely embedded within the 2DP 200; wherein the 1DP 100 and the 2DP 200 are each composed of a dielectric material other than air; wherein the 1DP 100 and the 2DP 200 each have a planar cross-section profile 102, 202 perpendicular to a particular linear axis 22 of the 3D body 20 that is constant along the particular linear axis 22; wherein at least a portion of the 3D body 20 forms a dielectric resonator, DR. In an embodiment, the 1DP 100 forms the DR and the 2DP 200 forms a dielectric lens or waveguide. As can be seen in FIGS. 1A-1C, the particular linear axis 22 depicted is the x-axis of an orthogonal x-y-z coordinate system of the 3D body 20, however, it will be appreciated from other embodiments disclosed, described, and illustrated herein, that an embodiment of the invention is not limited to the particular linear axis 22 being the x-axis of an orthogonal x-y-z coordinate system of the 3D body 20, but may in be the z-axis of a cylindrical r-θ-z coordinate system of the 3D body 20, which will be discussed further herein below. In an embodiment, the 3D body 20, including the 1DP 100 and the 2DP 200, is an extrusion along the particular linear axis 22, where the 1DP 100 and the 2DP 200 both extend along the particular linear axis 22 in a manner similar to each other.

With reference still to FIGS. 1A-1C, an embodiment of the 3D body 20 includes: a planar cross-section profile 102 of the respective 1DP 100 that may be any one of a bottom truncated ellipse or oval (FIGS. 1A and 1B) or a rectangle or square (FIG. 1C); and, a planar cross-section profile 202 of the respective 2DP 200 that may be any one of a bottom truncated ellipse or oval (FIG. 1A), a bottom and top truncated ellipse or oval (FIG. 1B), or a rectangle or square (FIG. 1C). While certain planar cross-section profiles 102, 202 are depicted in FIGS. 1A-1C, it will be appreciated that these are example embodiments only and that an ambit of an invention disclosed herein is not so limited, but is only limited by the scope of the appended claims. In an embodiment, the 3D body 20 has a first planar end 24 and an opposing second planar end 26 (hidden from view on the back side of the 3D body 20), the first and second planar ends 24, 26 having an outside cross-section profile that comprises both the 1DP 100 and the 2DP 200, where the first and second planar ends 24, 26 have the planar form of the combined planar cross-section profiles 102, 202. In an embodiment, the second planar end 26 is parallel with the first planar end 24, as depicted in FIGS. 1A-1C, however, it will be appreciated by a complete reading of this written description that an embodiment is not so limited and may include an embodiment where the first and second planar ends 24, 26 are not parallel with each other (see FIG. 5 for example discussed herein below). In an embodiment and as depicted in FIGS. 1A-1C, at least one of the first planar end 24 and the second planar end 26 is perpendicular to the particular linear axis 22. In an embodiment, one or both of the first planar end 24 and the second planar end 26 has an outside 2D profile comprising any one of the following shapes: a complete or partial circle; a complete or partial ellipse; a complete or partial square; a complete or partial rectangle; a complete or partial triangle; a complete or partial pentagon; a complete or partial hexagon; a complete or partial octagon; a complete or partial parallelogram; a complete or partial trapezoid; or, a combination of any of the foregoing shapes. In an embodiment, the first and second planar ends 24, 26 of 1DP 100 has the same or a similar 2D shape as the first and second planar ends 24, 26 of the 2DP 200 (FIGS. 1A and 1C, for example). Alternatively, in an embodiment the first and second planar ends 24, 26 of 1DP 100 has a different or a dissimilar 2D shape as the first and second planar ends 24,26 of the 2DP 200 (FIG. 1B for example).

Figure 2A:
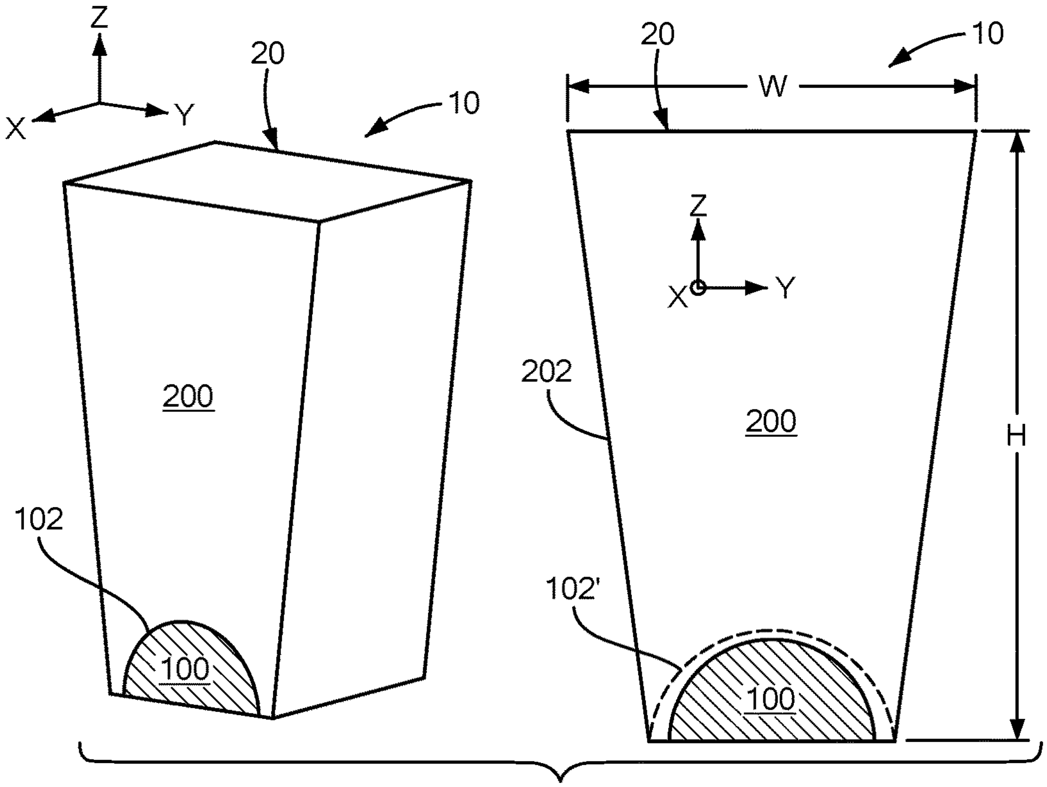
FIGS. 2A and 2B, each depict a rotated isometric view and a corresponding front view of an EM device alternative to those depicted in FIGS. 1A-1C, in accordance with an embodiment.
Figure 2B:
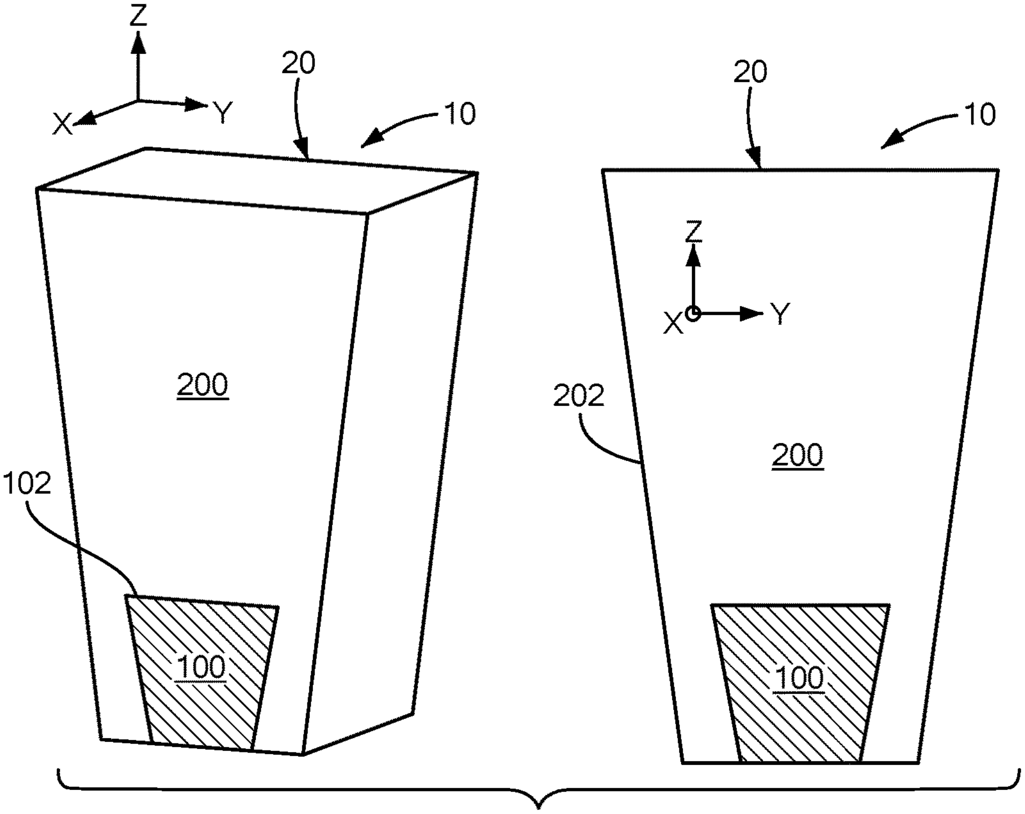

Reference is now made to FIGS. 2A-2B, which depict an EM device 10 having a 3D body 20 similar to that of FIGS. 1A-1C, but with different combinations of geometric shapes for the 1DP 100 and the 2DP 200. In FIG. 2A, the 1DP 100 has an extrusion planar cross-section profile 102 along the particular linear axis (x-axis) 22 that is a partial circle, while the 2DP 200 has an extrusion planar cross-section profile 202 along the particular linear axis (x-axis) 22 that is a trapezoid. In FIG. 2B, the 1DP 100 has an extrusion planar cross-section profile 102 along the particular linear axis (x-axis) 22 that is a trapezoid, and the 2DP 200 has an extrusion planar cross-section profile 202 along the particular linear axis (x-axis) 22 that is a trapezoid.

Figure 3A:
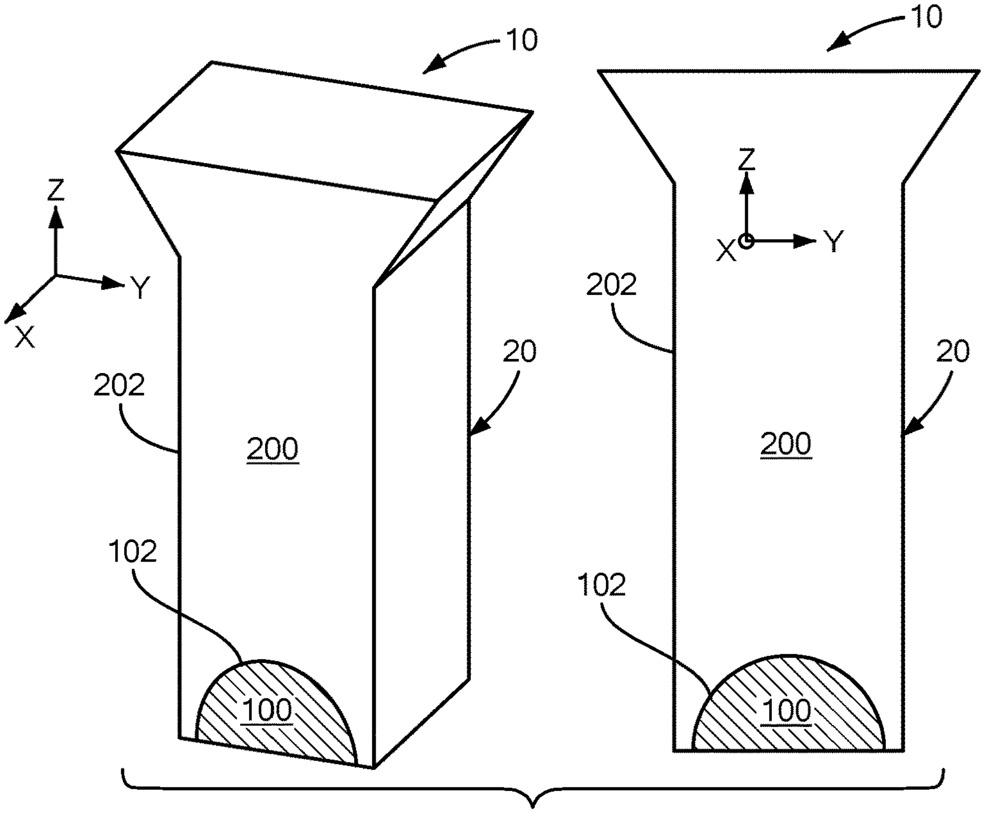
FIGS. 3A, 3B and 3C, each depict a rotated isometric view and a corresponding front view of an EM device alternative to those depicted in FIGS. 1A-1C and 2A-2B, in accordance with an embodiment.
Figure 3B:
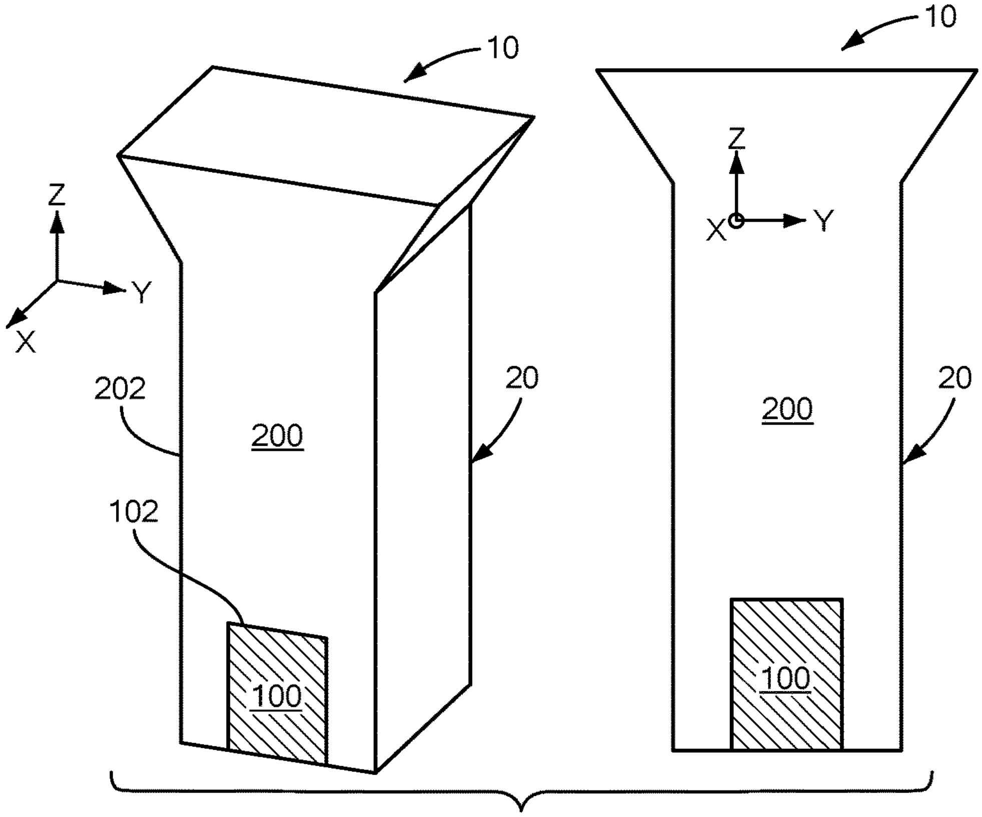
Figure 3C:
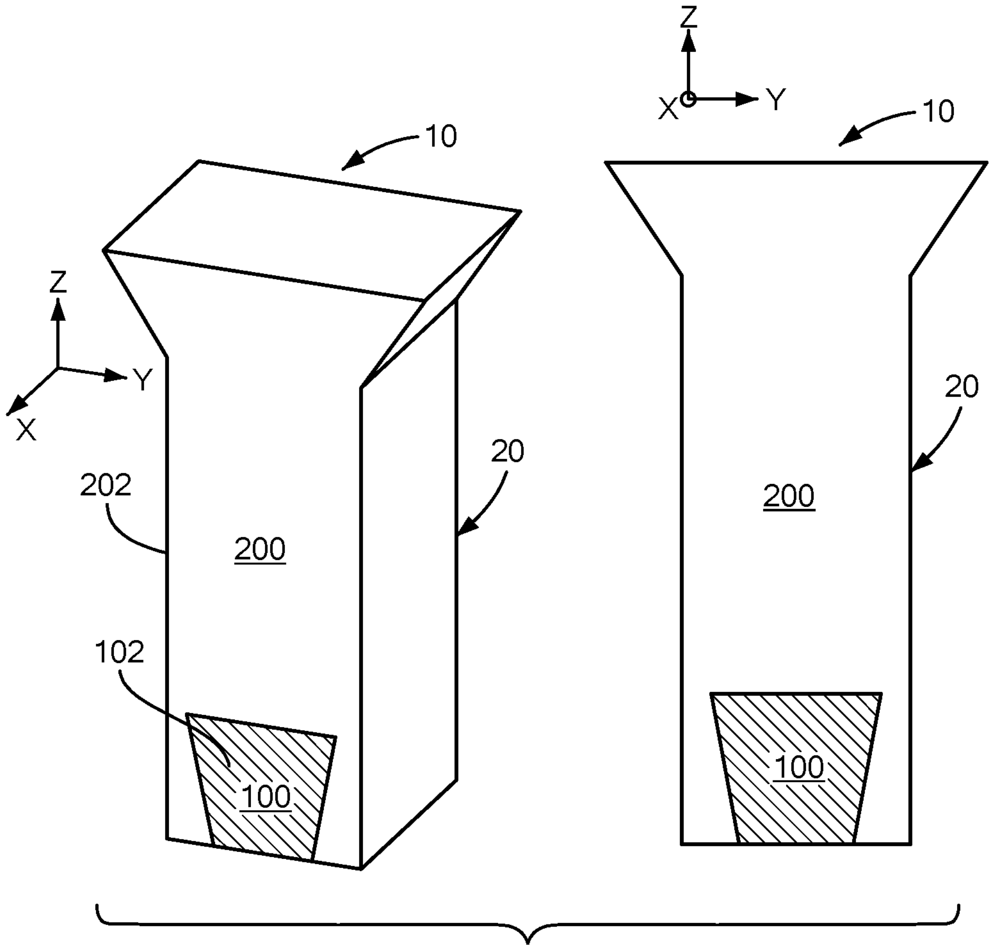

Reference is now made to FIGS. 3A-3D, which depict an EM device 10 having a 3D body 20 similar to that of FIGS. 1A-1C and 2A-2B, but with different combinations of geometric shapes for the 1DP 100 and the 2DP 200. In FIG. 3A, the 1DP 100 has an extrusion planar cross-section profile 102 along the particular linear axis (x-axis) 22 that is a partial circle, while the 2DP 200 has an extrusion planar cross-section profile 202 along the particular linear axis (x-axis) 22 that is a combination of a rectangle bottom with an integrally formed trapezoid top. In FIG. 3B, the 1DP 100 has an extrusion planar cross-section profile 102 along the particular linear axis (x-axis) 22 that is a rectangle, and the 2DP 200 has an extrusion planar cross-section profile 202 along the particular linear axis (x-axis) 22 that is a combination of a rectangle bottom with an integrally formed trapezoid top. In FIG. 3C, the 1DP 100 has an extrusion planar cross-section profile 102 along the particular linear axis 22 (x-axis for example) that is a trapezoid, and the 2DP 200 has an extrusion planar cross-section profile 202 along the particular linear axis 22 (x-axis for example) that is a combination of a rectangle bottom with an integrally formed trapezoid top.

As noted herein above and seen with reference to FIGS. 1A-1C, 2A-2B and 3A-3C, the planar cross-section profiles 102, 202 may be similar in shape or different in shape with respect to each other, depending on the desired EM performance characteristics of the EM device 10.

With respect to any of the foregoing 1DP 100 and 2DP 200, or any 1DP and 2DP subsequently described herein, the 1DP 100 is composed of a first dielectric material having a first average dielectric constant, 1Dk, and the 2DP 200 is composed of a second dielectric material having a second average dielectric constant, 2Dk, wherein the 2Dk is different from the 1Dk. In an embodiment: the 1Dk is greater than the 2Dk; the 1Dk is greater than 3 and equal to or less than 20, and the 2Dk is greater than 1 and equal to or less than 3. In an alternative embodiment: the 2Dk is greater than the 1Dk; the 2Dk is greater than 3 and equal to or less than 20, and the 1Dk is greater than 1 and equal to or less than 3. In an embodiment: at least one of the first dielectric material of the 1DP 100 and the second dielectric material of the 2DP 200 is homogenous; both of the first dielectric material of the 1DP 100 and the second dielectric material of the 2DP 200 is homogenous; or, neither of the first dielectric material of the 1DP 100 and the second dielectric material of the 2DP 200 is homogenous. In an embodiment: at least one of the first dielectric material of the 1DP 100 and the second dielectric material of the 2DP 200 comprises air; both of the first dielectric material of the 1DP 100 and the second dielectric material of the 2DP 200 comprises air; or, neither of the first dielectric material of the 1DP 100 and the second dielectric material of the 2DP 200 comprises air. As used herein, the phrase “a dielectric material other than air” necessarily includes a Dk material that is not air, but may also include air or any other gas suitable for a purpose disclosed herein, which includes a foam. As used herein, the phrase “comprising/comprises air” necessarily includes air, but also does not preclude a Dk material that is not air, which includes a foam. Also, the term “air” may more generally be referred to and viewed as being a gas having a dielectric constant that is suitable for a purpose disclosed herein.

As noted herein above with respect to any of the foregoing 3D bodies 20, each 3D body 20 has the construct of an extrusion where the 1DP 100 and the 2DP 200 have constant planar cross-section profiles 102, 202 along the particular linear axis 22 (x-axis for example), and have the associated 1DP 100 and the associated 2DP 200 with a bottom surface that is coincidental with the illustrated associated x-y plane. That said, it is contemplated that an embodiment may include an arrangement where only the 1DP 100 has a bottom surface that is coincidental with the illustrated associated x-y plane by having a bottom width that extends outward to an outer edge of the 3D body 20, as observed from a front view in the y-z plane (see dashed line 102' in FIG. 2A for example). Here, it is contemplated that an extrusion or coextrusion manufacturing process may be employed to create such a construct.

Figure 4:
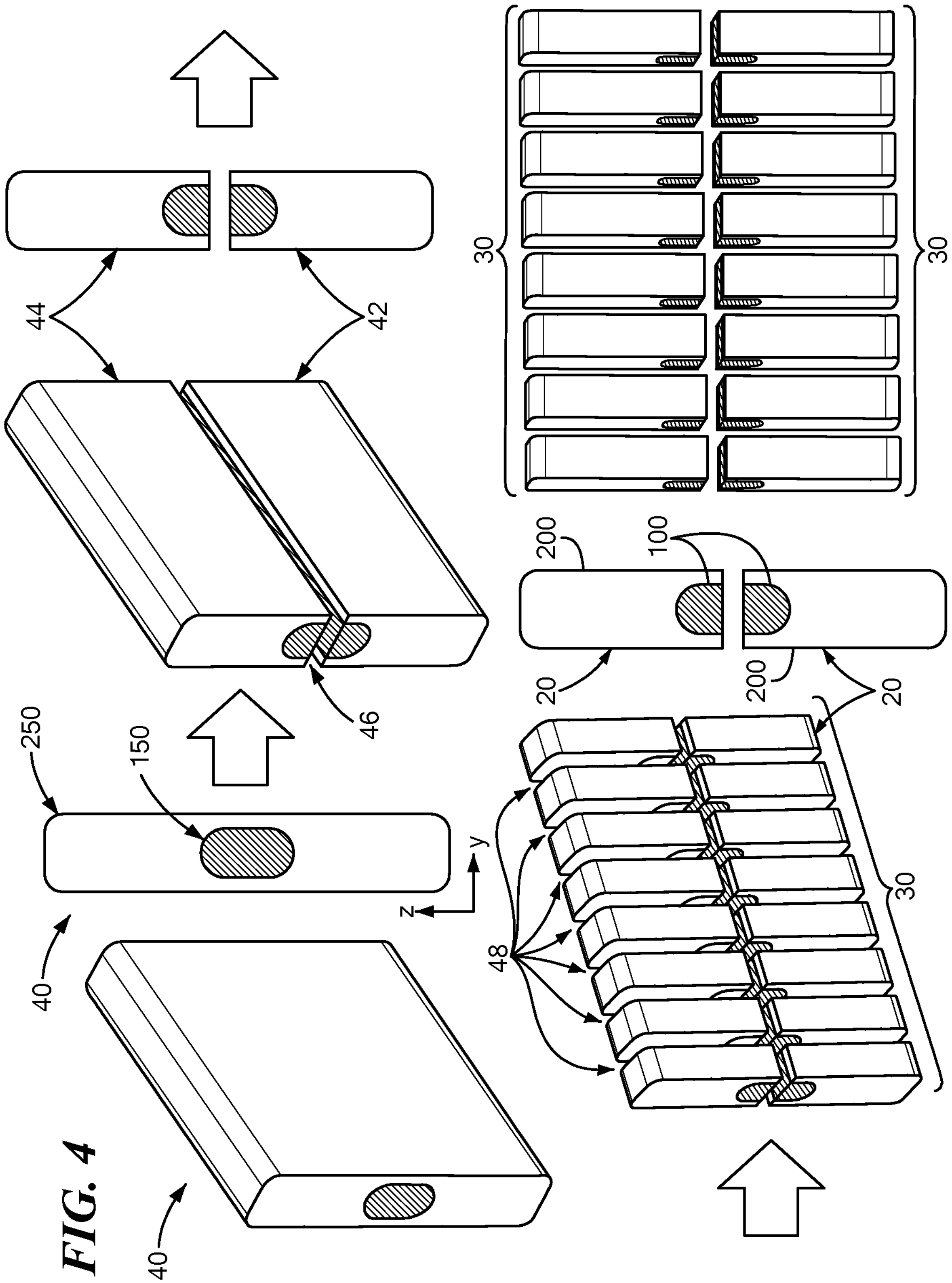
FIG. 4 depicts several views and process steps, including cutting process steps, of a 3D construct that may be usable to produce a 3D body as disclosed herein, in accordance with an embodiment.

Reference is now made to FIG. 4, which depicts a 3D construct 40 that may be initially created to then create a plurality of a 3D body 20 having any shape as disclosed herein. As can be seen, the 3D construct 40 can be employed to create a combined form 150 of a 1DP 100 and a combined form 250 of a 2DP 200, where the 1DP 100 and the 2DP 200 may have any shape as disclosed herein. The 3D construct 40 is then cut or otherwise severed 46 in a direction parallel with the particular linear axis 22 to create a first construct portion 42 and a second construct portion 44 of the 3D construct 40, and then cut or otherwise severed 48 in a direction perpendicular to the particular linear axis 22 into a plurality of 3D segments 30 to form a plurality of the 3D body 20. In an embodiment, the 3D construct 40 is severed down the center of the 3D construct, and the first and second construct portions 42, 44 are first and second halves of the 3D construct 40 that are mirror images of each other with respect to the x-y plane.

As will be appreciated from the foregoing description of the 3D construct 40, a method of manufacturing an EM device 10 having a 3D body 20 of dielectric material with a 1DP 100 and a 2DP 200, as disclosed herein, includes: providing a first dielectric material (represented by reference numeral 150 for example) having a first dielectric constant, 1Dk; providing a second dielectric material (represented by reference numeral 250 for example) having a second dielectric constant, 2Dk; combining and forming the first and second dielectric materials to produce a three-dimensional, 3D, construct 40 wherein the first dielectric material provides a combined form 150 of the 1DP 100 and wherein the second dielectric material provides a combined form 250 of the 2DP 200; severing 46 the 3D construct 40 in a direction parallel to the particular linear axis 22 to provide a first construct portion 42 and a second construct portion 44 of the 3D construct 40; and severing 48 at least one of the first construct portion 42 and the second construct portion 44 in a direction perpendicular to the particular linear axis 22 to form a plurality of 3D segments 30 of the 3D body 20. In an embodiment, the severing 46 of the 3D construct 40 in a direction parallel to the particular linear axis 22 involves severing 46 the 3D construct down 40 a center of the 3D construct 40 to create two halves 42, 44 of the 3D construct 40. In an embodiment, the two halves 42, 44 of the 3D construct 40 are mirror images of each other with respect to an associated x-y plane. In an embodiment, the combining and forming of the first and second dielectric materials 150, 250 involves a coextruding process.

Figure 5:
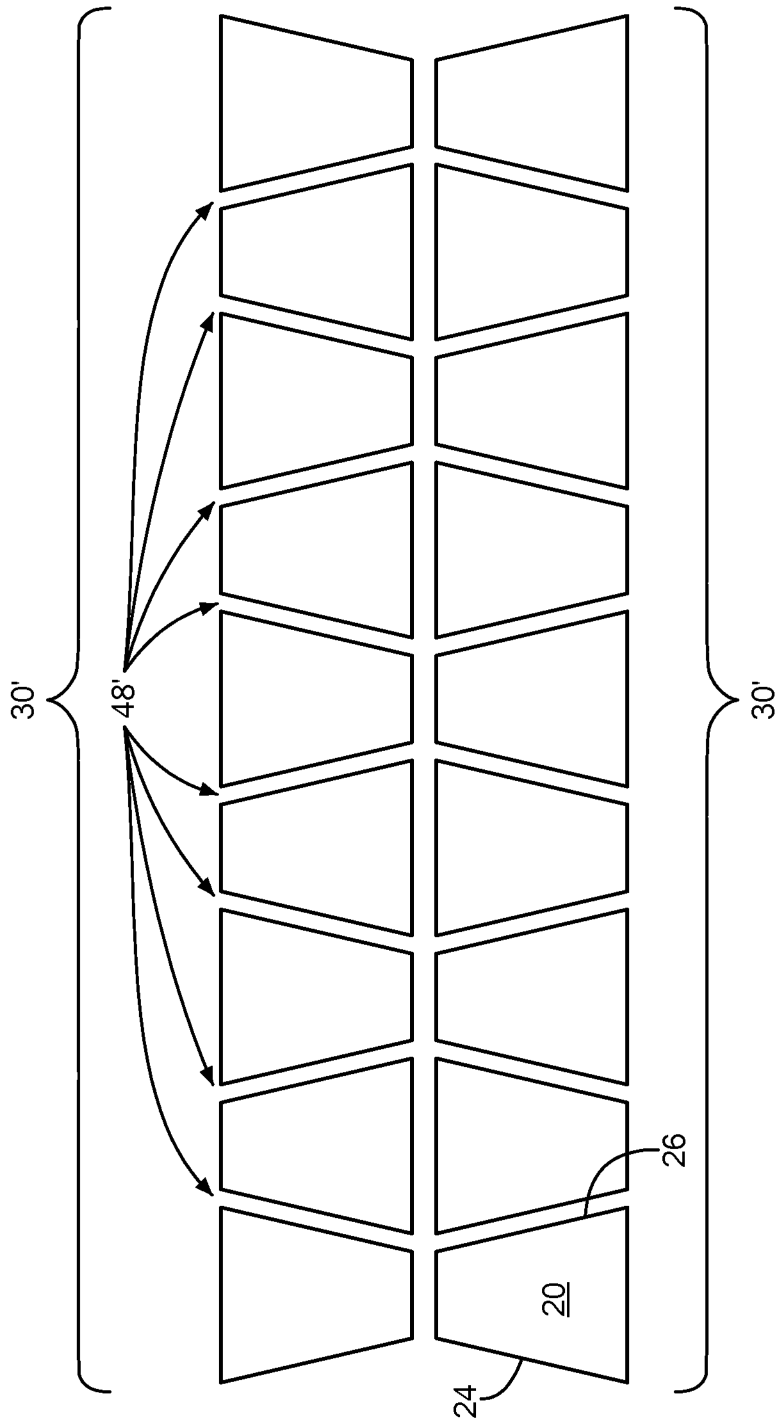
FIG. 5 depicts a block diagram side view of a cutting process steps alternative to that depicted in FIG. 4, in accordance with an embodiment.

Reference is now made to FIG. 5, which depicts a plurality of segments 30' similar to segments 30 depicted in FIG. 4 but with cuts 48' that create first and second planar ends 24, 26 of the 3D body 20 that are not parallel with each other.

From the foregoing, it will be appreciated that an embodiment of the 3D body 20 includes an arrangement of the 1DP 100 and the 2DP 200 where the dielectric material of the 3D body 20 has a dielectric constant that is variant in two axial directions of an orthogonal x-y-z coordinate system. See FIGS. 1A-1C for example where the dielectric constant varies from the origin of the x-y-z coordinate axes along both the y-axis and the z-axis, but is constant along the x-axis.

Reference is now made to FIGS. 6A, 6B, 6C and 6D, where each figure depicts an example alternative form of an EM device 10 having a 3D body 20 with a 1DP 100 and a 2DP 200 similar to those described herein above, but where the particular linear axis 22 is the z-axis of a cylindrical r-θ-z coordinate system, and where the planar cross-section profile 102, 202 of the 1DP 100 and the 2DP 200 of the 3D body 20 that is perpendicular and constant along the particular linear axis 22 of the 3D body 20 is an r-θ planar cross-section profile that is perpendicular to and constant along a z-axis of the cylindrical r-θ-z coordinate system of the 3D body 20. In an embodiment, the 3D body 20 is extruded or co-extruded along the z-axis. As described herein above, the 1DP 100 is at least partially but not completely embedded within the 2DP 200. Here, the 2DP 200 is disposed radially outboard of the 1DP 100. Similar to the foregoing described EM devices 10, the 1DP 100 is composed of a first dielectric material having a first average dielectric constant, 1Dk, and the 2DP 200 is composed of a second dielectric material having a second average dielectric constant, 2Dk, wherein the 2Dk is different from the 1Dk. In an embodiment: the 1Dk is greater than the 2Dk; the 1Dk is greater than 3 and equal to or less than 20, and the 2Dk is greater than 1 and equal to or less than 3. In an alternative embodiment: the 2Dk is greater than the 1Dk; the 2Dk is greater than 3 and equal to or less than 20, and the 1Dk is greater than 1 and equal to or less than 3. In an embodiment: at least one of the first dielectric material of the 1DP 100 and the second dielectric material of the 2DP 200 is homogenous; both of the first dielectric material of the 1DP 100 and the second dielectric material of the 2DP 200 is homogenous; or, neither of the first dielectric material of the 1DP 100 and the second dielectric material of the 2DP 200 is homogenous. In an embodiment: at least one of the first dielectric material of the 1DP 100 and the second dielectric material of the 2DP 200 comprises air; both of the first dielectric material of the 1DP 100 and the second dielectric material of the 2DP 200 comprises air; or, neither of the first dielectric material of the 1DP 100 and the second dielectric material of the 2DP 200 comprises air.

Figure 6A:
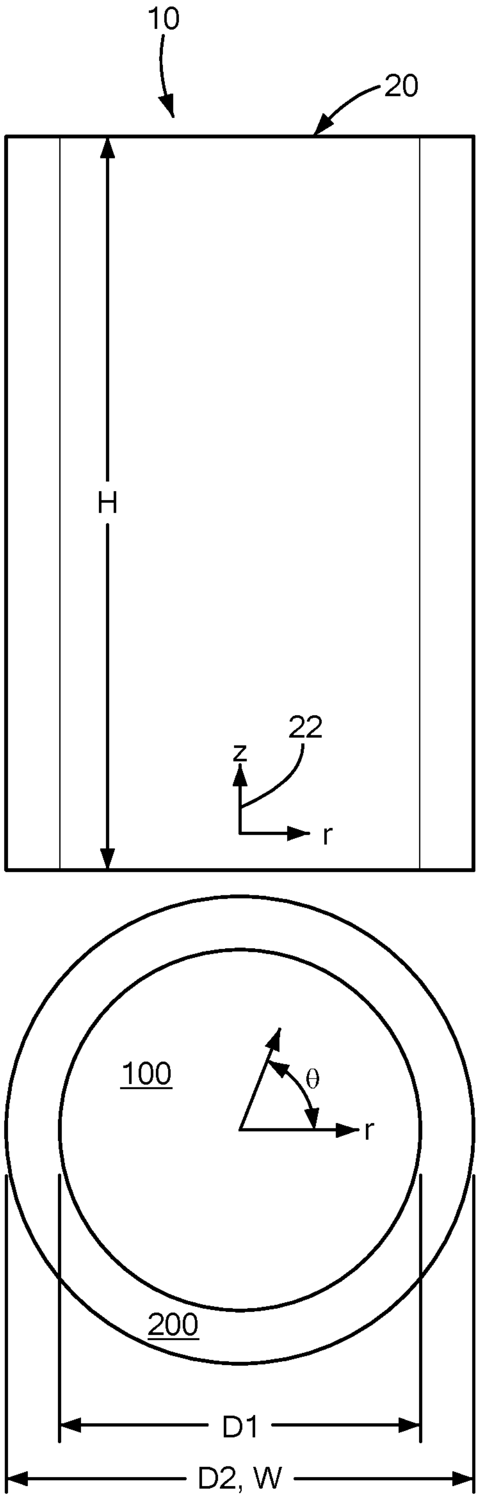
FIGS. 6A, 6B, 6C and 6D, each depict a plan view and a corresponding side elevation view of an EM device alternative to those depicted in FIGS. 1A-1C and 2A-2B, in accordance with an embodiment.
Figure 6B:
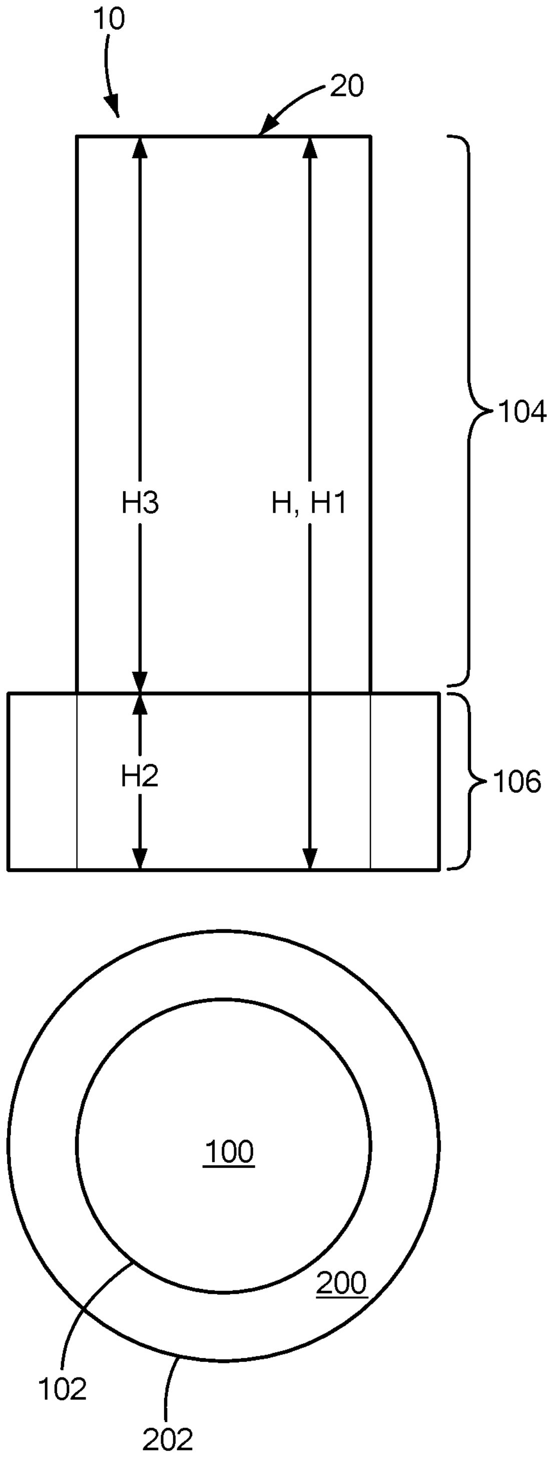
Figure 6C:
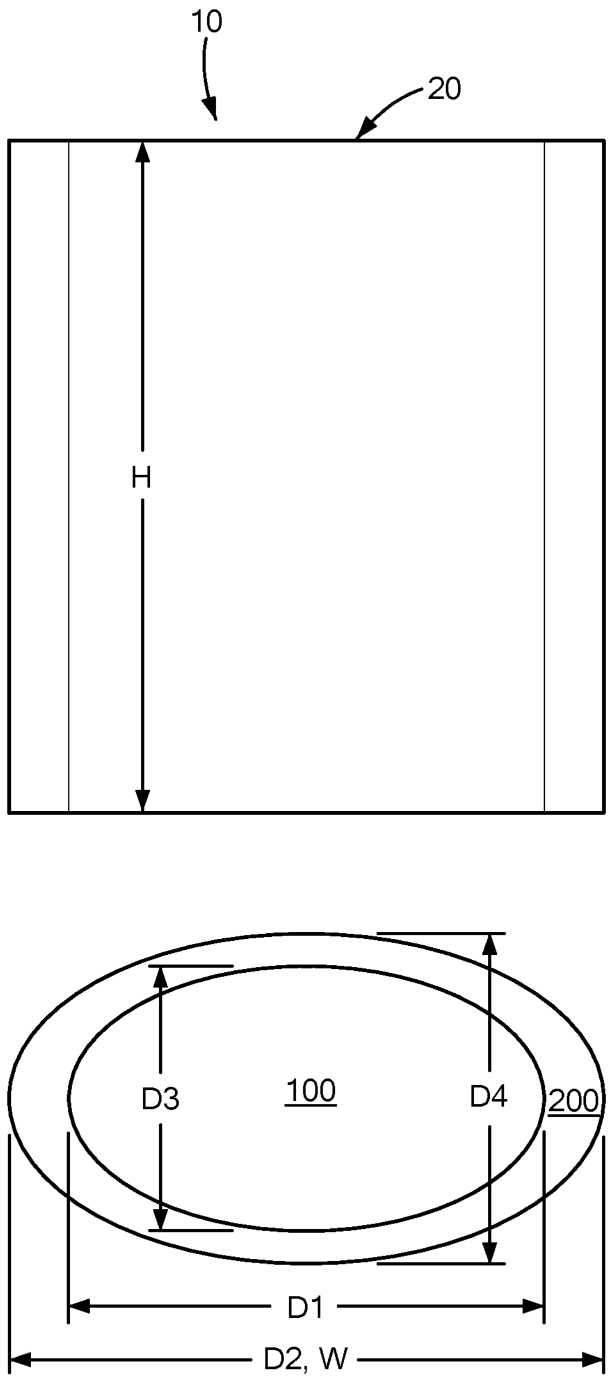
Figure 6D:
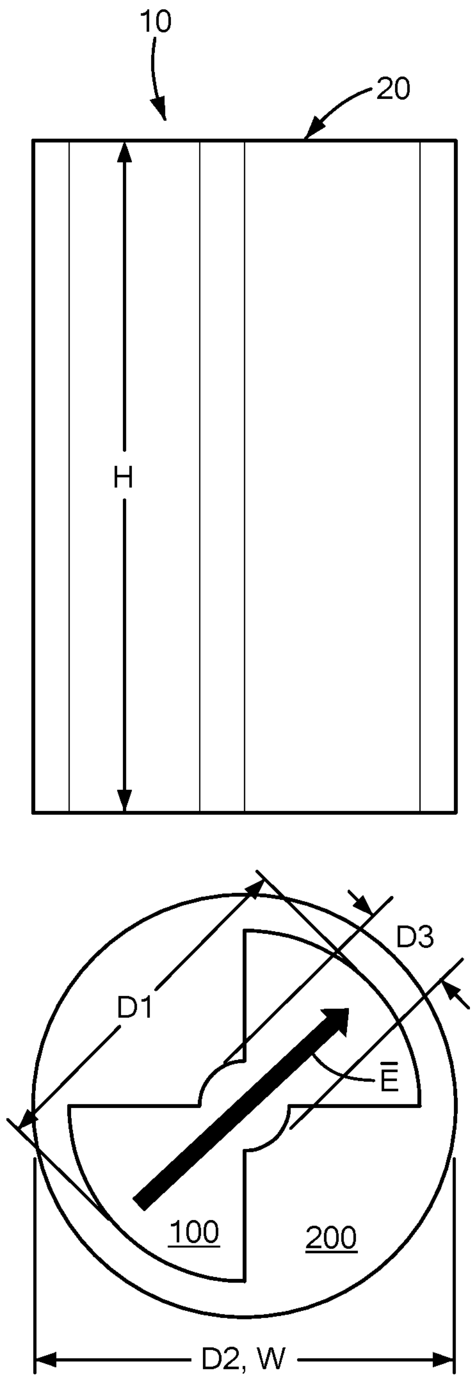

FIG. 6A depicts a regular circular cylinder shape for both the 1DP 100 and the 2DP 200 having a same height H and respective outside dimensions D1 and D2 (diameters in FIG. 6A), resulting in the 3D body 20 having a cylindrical 1DP 100 with a uniform thickness 2DP 200 over the entire height H. FIG. 6B depicts a 1DP 100 and a 2DP 200 similar to those of FIG. 6A (with respective diameters D1 and D2, depicted in FIG. 6A) but with the height H2 of the 2DP 200 being less than the height H1 of the 1DP 100, resulting in the 3D body 20 having a cylindrical 1DP 100 of height H1 with a large base formed by the 2DP 200 having a uniform thickness over the height H2. FIG. 6C depicts an elliptical or oval cylinder shape for both the 1DP 100 and the 2DP having a same height H, which is similar to that depicted in FIG. 6A but with an elliptical or oval footprint. As shown in FIG. 6C, the 1DP 100 has a major outside dimension D1 and a minor outside dimension D3, and the 2DP 200 has a major outside dimension D2 and a minor outside dimension D4. FIG. 6D depicts a 3D body 20 having an extruded form along the z-axis similar to those of FIGS. 6A-6C, but with the 1DP 100 having a bowtie shaped cross-section perpendicular to the z-axis that is at least partially embedded in the 2DP 200 having a z-axis cross-section with a circular shaped outer profile having an outside dimension D2. As shown in FIG. 6D, the bowtie shaped 1DP 100 is formed of a partial circular cylinder having an outside dimension of D1 and an integrally formed smaller circular cylinder having an outside dimension of D3. By configuring the 1DP 100 in a bowtie shape as depicted in FIG. 6D, the EM device 10 is productive of a circularly polarized radiation pattern where the major E-field lines would be in the general direction of arrow $\overline{E}$. As can be seen by comparing the various z-axis cross-section profiles of the 1DP 100 and the 2DP 200 of FIGS. 6A-6D, it will be appreciated that the z-axis footprints of the 1DP 100 and the 2DP 200 can be the same, similar, or different. In an embodiment and with respect to any EM device 10 disclosed herein, height H is greater than any overall outside dimension D1, D2, D3 and D4, and in an embodiment H is at least 1.5 times greater than any overall outside dimension D1, D2, D3 and D4.

With reference particularly to FIG. 6B, an embodiment of the 3D body 20 may be described as the 1DP 100 having an extension portion 104 that is seamlessly and integrally formed with a base portion 106 of the 1DP 100, the extension portion 104 having a planar cross-section profile 102 along the particular linear axis 22 and at a distance from the base portion 106 that is identical to the planar cross-section profile 102 of the 1DP 100. As depicted in the embodiment of FIG. 6B, the 1DP 100 has a length H1 along the particular linear axis 22, the base portion 106 has a length H2 along the particular linear axis 22, the extension portion 104 has a length H3 along the particular linear axis 22, where H3 is greater than H2, and H2+H3=H1. In an embodiment, H3 is greater than 2 times H2.

Figure 7A:
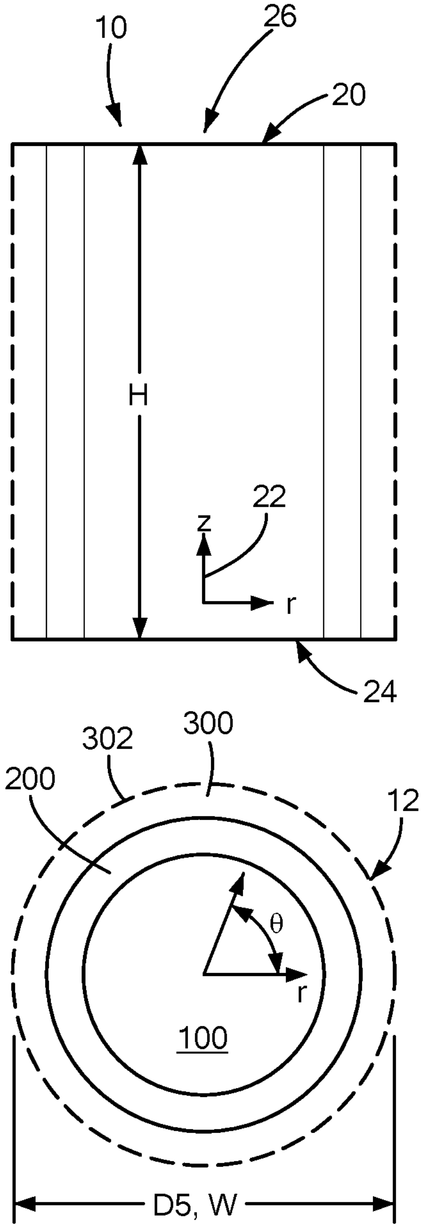
FIGS. 7A, 7B and 7C, each depict a plan view and a corresponding side elevation view of an EM device alternative to those depicted in FIGS. 6A, 6C and 6D, in accordance with an embodiment.
Figure 7B:
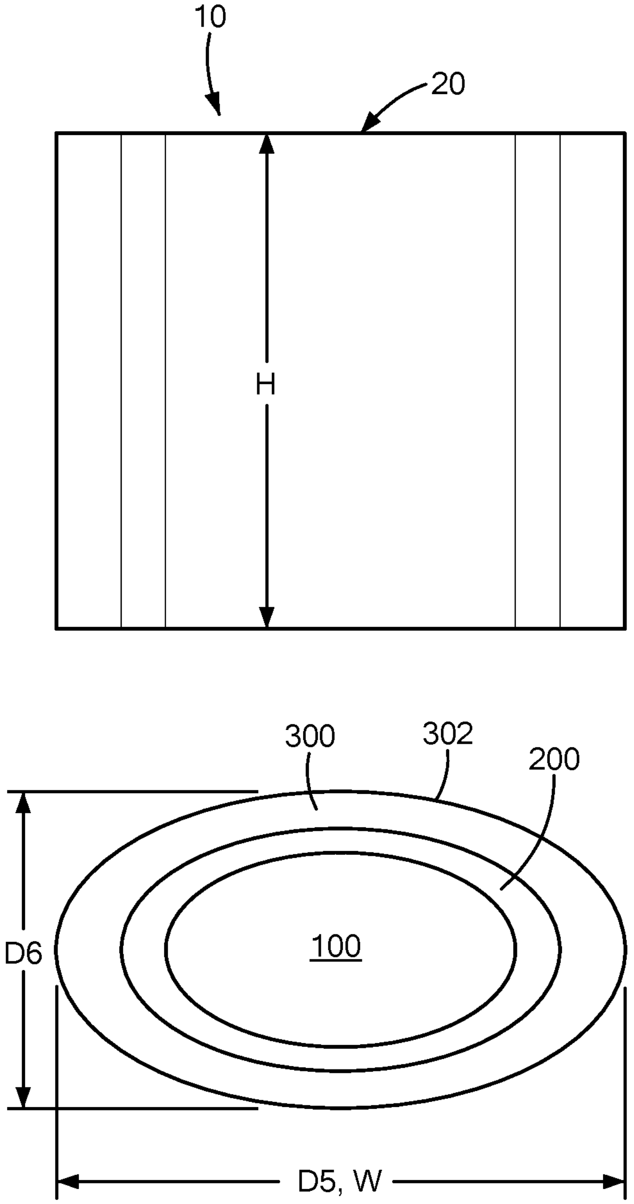
Figure 7C:
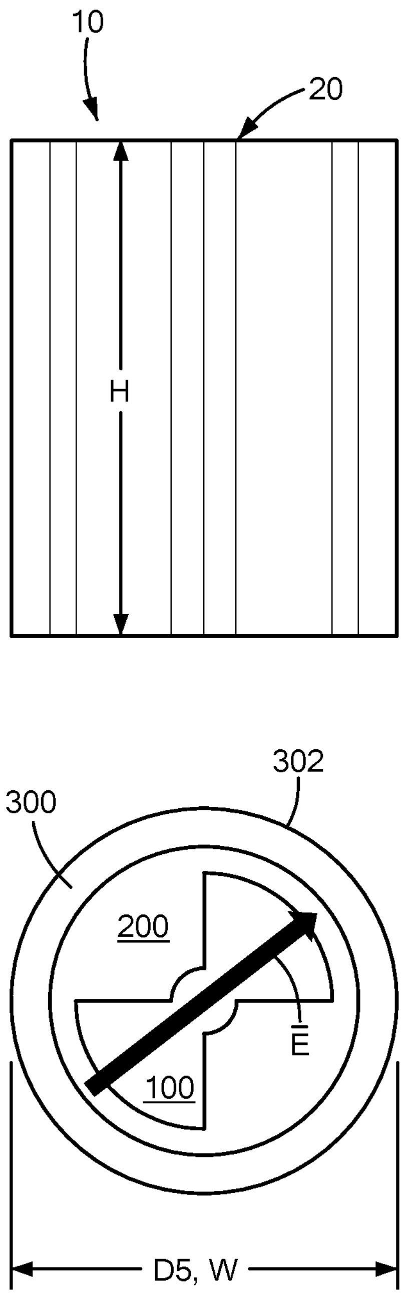

Reference is now made to FIGS. 7A, 7B and 7C, where each figure depicts an example EM device 10 similar to those depicted in FIGS. 6A, 6C and 6D, respectively, but where the 3D body 20 further includes at least a third dielectric portion, 3DP, 300, where the 2DP 200 is at least partially but not completely embedded within the 3DP 300, and where the 3DP 300 has a planar cross-section profile 302 perpendicular to the particular linear axis 22 (the z-axis in FIGS. 7A-7C) of the 3D body 20 that is constant al Bong the particular linear axis 22. In an embodiment, the planar cross-section profile 302 at a planar end of the 3D body 20 along the particular linear axis 22 includes the 3DP 300. Here, the 1DP 100 is composed of a first dielectric material having a first average dielectric constant, 1Dk, the 2DP 200 is composed of a second dielectric material having a second average dielectric constant, 2Dk, and the 3DP 300 is composed of a third dielectric material having a third average dielectric constant, 3Dk, wherein the 3Dk is different from the 2Dk and the 2Dk is different from the 1Dk. In an embodiment, the 3Dk is equal to the 1Dk. In an alternative embodiment, the 3Dk is not equal to the 1Dk. In an embodiment: the 1Dk is greater than the 2Dk; the 1Dk is greater than 3 and equal to or less than 20, and the 2Dk is greater than 1 and equal to or less than 3. In an alternative embodiment: the 2Dk is greater than the 1Dk; the 2Dk is greater than 3 and equal to or less than 20, and the 1Dk is greater than 1 and equal to or less than 3. In an embodiment: at least one of the first dielectric material of the 1DP 100 and the second dielectric material of the 2DP 200 is homogenous; both of the first dielectric material of the 1DP 100 and the second dielectric material of the 2DP 200 is homogenous; or, neither of the first dielectric material of the 1DP 100 and the second dielectric material of the 2DP 200 is homogenous. In an embodiment: at least one of the first dielectric material of the 1DP 100 and the second dielectric material of the 2DP 200 comprises air; both of the first dielectric material of the 1DP 100 and the second dielectric material of the 2DP 200 comprises air; or, neither of the first dielectric material of the 1DP 100 and the second dielectric material of the 2DP 200 comprises air. In an embodiment, the 3Dk is greater than 1 and equal to or less than 3. In an alternative embodiment, the 3Dk is greater than 3 and equal to or less than 20. In an embodiment, the 3Dk is homogenous. In an alternative embodiment, the 3Dk is non-homogeneous. In an embodiment, the 3Dk comprises air. In an alternative embodiment the 3Dk does not comprise air.

By comparing FIGS. 7A-7C with FIGS. 6A, 6C and 6D, respectively, it will be appreciated that the various height H and outside dimensions D1-D4 depicted in FIGS. 6A, 6C and 6D may equally apply to the embodiments of FIGS. 7A-7C without the need for repetitive labeling. With respect to FIG. 7B, the 3DP 300 has an elliptical or oval cylinder shape in the r-θ plane (plan view) with a major outside dimension D5 and a minor outside dimension D6, which mimics the elliptical or oval shape of the 1DP 100 and the 2DP 200.

With reference to any of the foregoing descriptions, an embodiment of the 3D body 20 has an overall height, H, in a direction parallel to the z-axis of either an orthogonal x-y-z coordinate system or a cylindrical r-θ-z coordinate system of the 3D body 20, and an overall maximum outside dimension, W, in a direction perpendicular to the z-axis, where H is greater than W, alternatively H is equal to or greater than 2 times W, further alternatively H is equal to or greater than 3.5 times W.

With reference to FIGS. 7A-7C in combination with FIGS. 4 and 5, it will be appreciated that a 3DP 300 may be embedded within the 2DP 200 of the 3D construct 40 to create a 3D body 20 in a manner similar to that described herein above in connection with FIGS. 4 and 5 but with three dielectric portions, a 1DP 100, a 2DP 200, and a 3DP 300. While only three consecutively embedded dielectric portions are disclosed herein, it will be appreciated that a scope of the invention is not so limited and encompasses any number of consecutively embedded dielectric portions consistent with the disclosure herein.

With reference particularly to but not limited to FIG. 7A, any EM device 10 disclosed herein, may further include an outer metallic layer 12 (depicted by dashed lines in FIG. 7A) that covers the 3D body 20, except for planar ends 24, 26 of the 3D body 20. In an embodiment, the metallic layer 12 comprises copper.

Figure 8B:
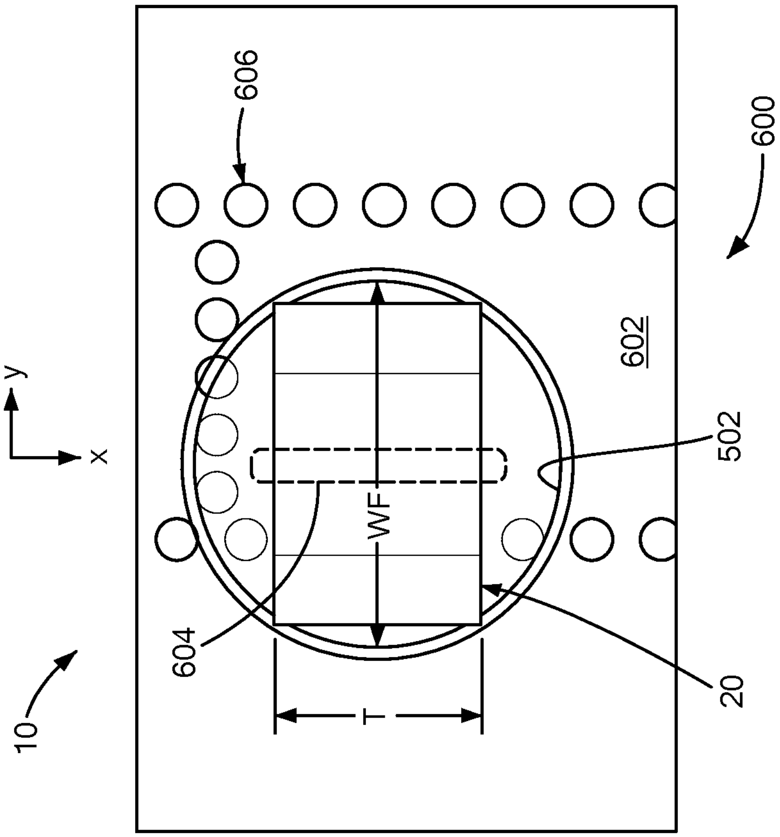
FIGS. 8A and 8B respectively depict a transparent side elevation view and a corresponding transparent plan view of an EM device having a 3D body similar to that depicted in FIG. 4 and disposed on a substrate having an EM signal feed, in accordance with an embodiment.
Figure 8A:
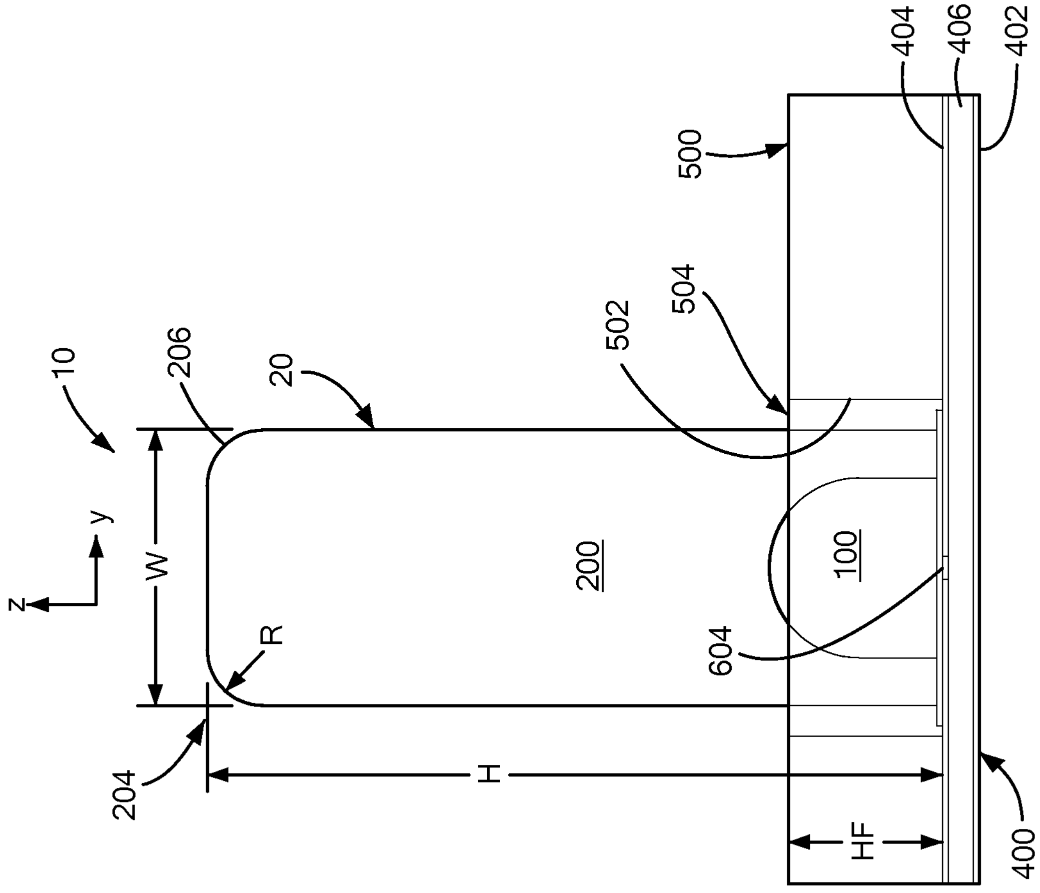

Reference is now made to FIGS. 8A and 8B that depict an example EM device 10 consistent with a disclosure herein having a 3D body 20 with a 1DP 100 and a 2DP 200 structured similar to that of FIG. 4, where the 3D body 20 is disposed on a substrate 400 with an electrically conductive fence 500 having a wall 502 that substantially or completely surrounds the 3D body 20. In an embodiment, the substrate 400 comprises an EM signal feed 600 electromagnetically coupled to the 3D body 20, where in an embodiment the EM signal feed 600 comprises a substrate integrated waveguide, SIW, 602 with an elongated coupling slot 604. As depicted in FIGS. 8A, 8B the substrate 400 is a laminate composed of a lower electrically conductive layer 402, an upper electrically conductive layer 404 comprising the elongated coupling slot 604, and a dielectric medium 406 disposed therebetween, where the SIW 602 is formed by way of electrically conductive vias 606 electrically connected between the lower and upper electrically conductive layers 402, 404 through the dielectric medium 406, and where the electrically conductive fence 500 and the 3D body 20 are disposed directly on the upper electrically conductive layer 404 with the elongated coupling slot 604 centrally disposed relative to the 1DP 100. In an embodiment, the electrically conductive fence 500 has a height HF and width WF that provides a recess 504 in which the 3D body 20 is disposed, where H is greater than HF and in an embodiment H is equal to or greater than 3 times HF. In the example 3D body 20 of FIGS. 8A and 8B, the 1DP 100 has a Dk of 14 and the 2DP 200 has a Dk of 3, the 2DP 200 has a height H=3.7 mm, a width W=1.4 mm, and a thickness T=0.9 mm. In the example 3D body 20 of FIG. 8A, the 2DP 200 has a distal end 204 at a distance from the substrate 400 with upper outer corners 206 parallel to the x-axis having a defined radius, R, that is greater than zero (i.e., not a sharp corner). In an embodiment, R is greater than 0 mm and equal to or less than 0.5 mm, and in the example embodiment of FIGS. 8A and 8B R=0.3 mm, which facilitates ease of manufacturing with an extrusion or coextrusion process and associated extrusion/coextrusion die.

Figure 9:
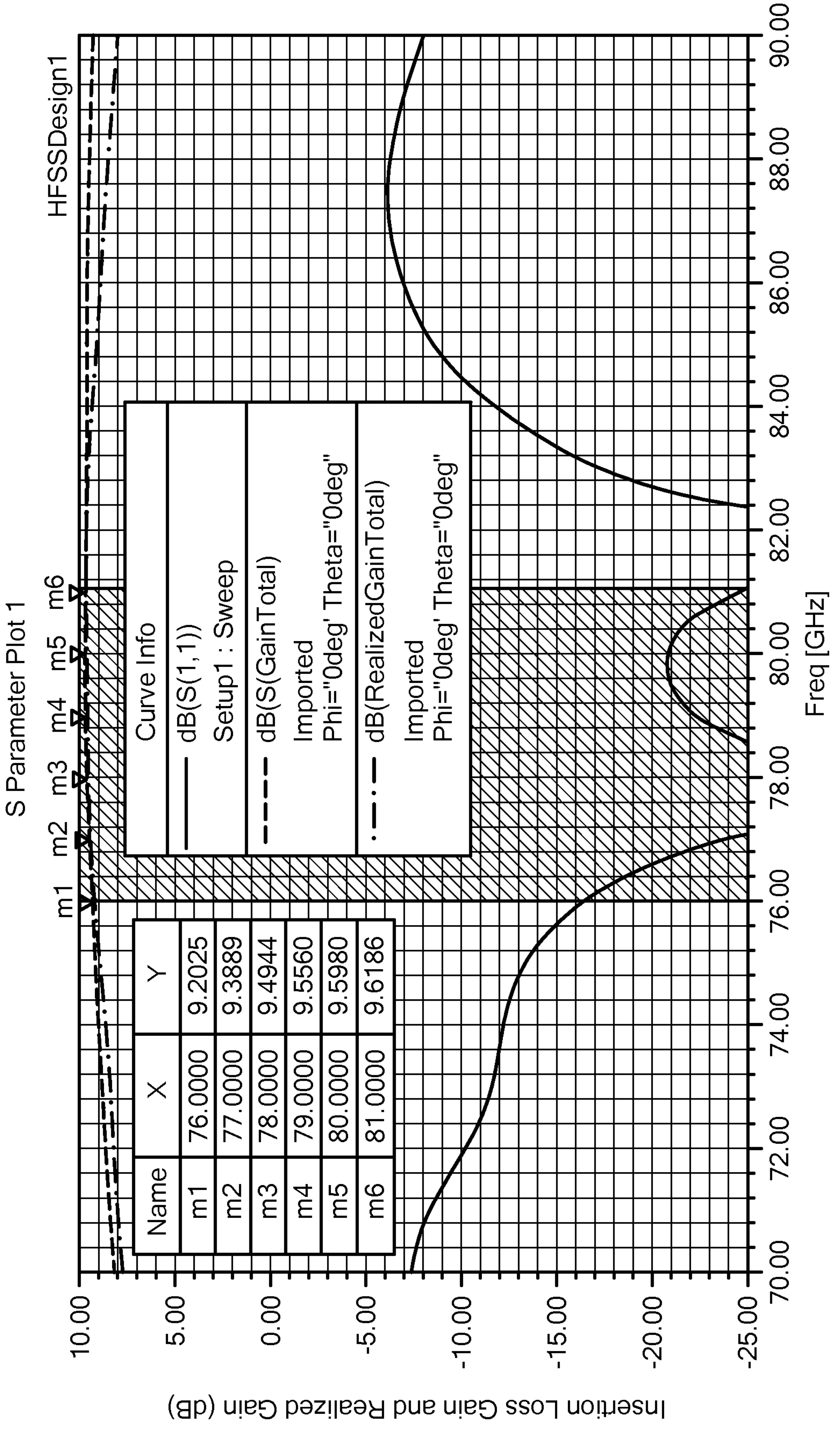
FIGS. 9 and 10 depict analytically modeled performance characteristics of the EM device depicted in FIGS. 8A and 8B, in accordance with an embodiment.
Figure 10:
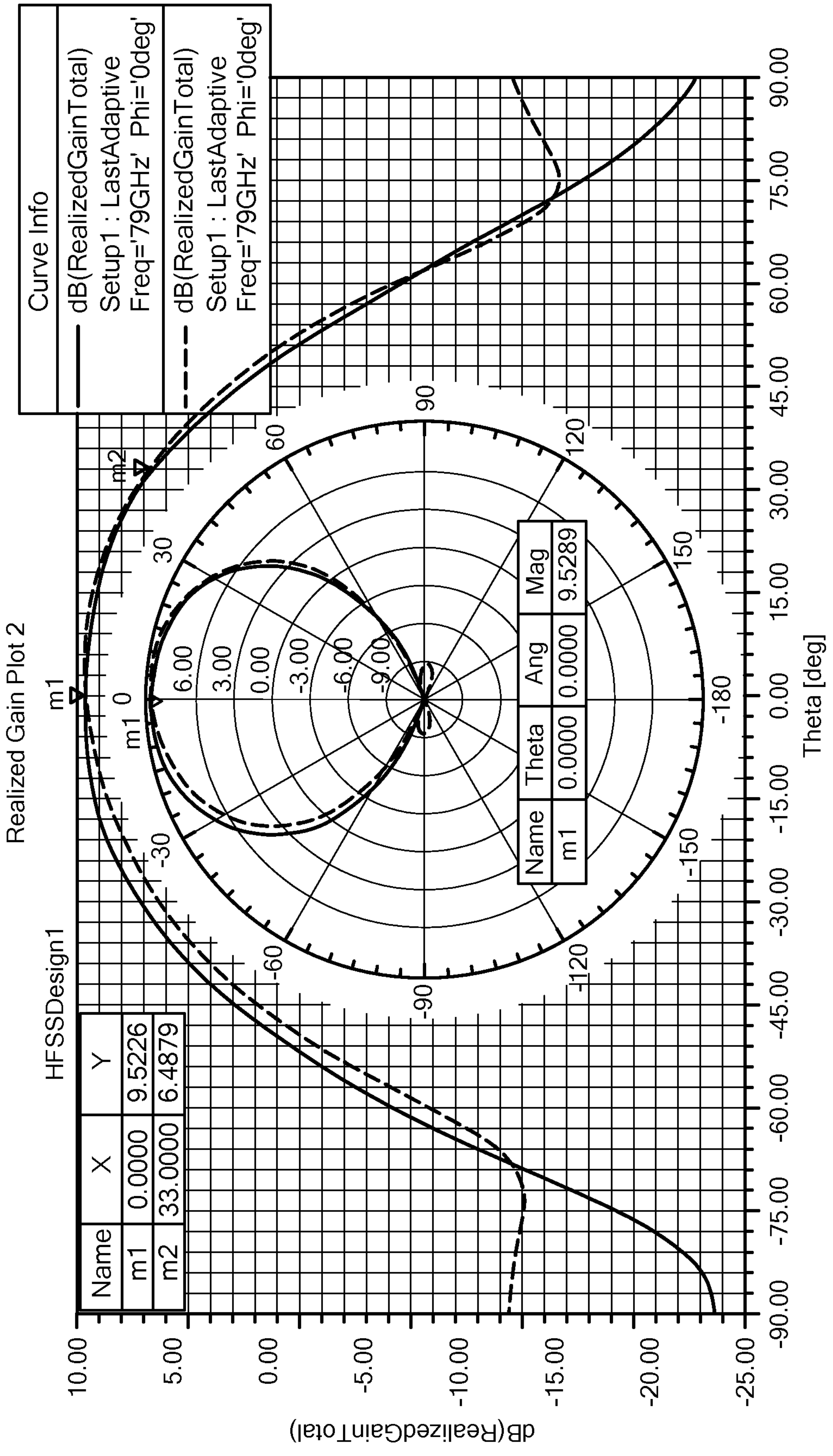

Reference is now made to FIGS. 9-10 that depict various analytically modelled operating characteristics of the EM device 10 of FIGS. 8A and 8B. For example, FIG. 9 depicts a plot of the (S(1,1)) insertion loss gain and realized gain in dBi as a function of frequency in GHz, and FIG. 10 depicts realized gain in dBi at two orthogonal angles, Phi=0-deg (y-z plane) and Phi=90-deg (x-z plane). As can be seen, the gain is fairly constant over a frequency range of 76 GHz-81 GHz (FIG. 9), and is fairly uniform as a function of the azimuth angle Phi (FIG. 10).

Figure 11A:
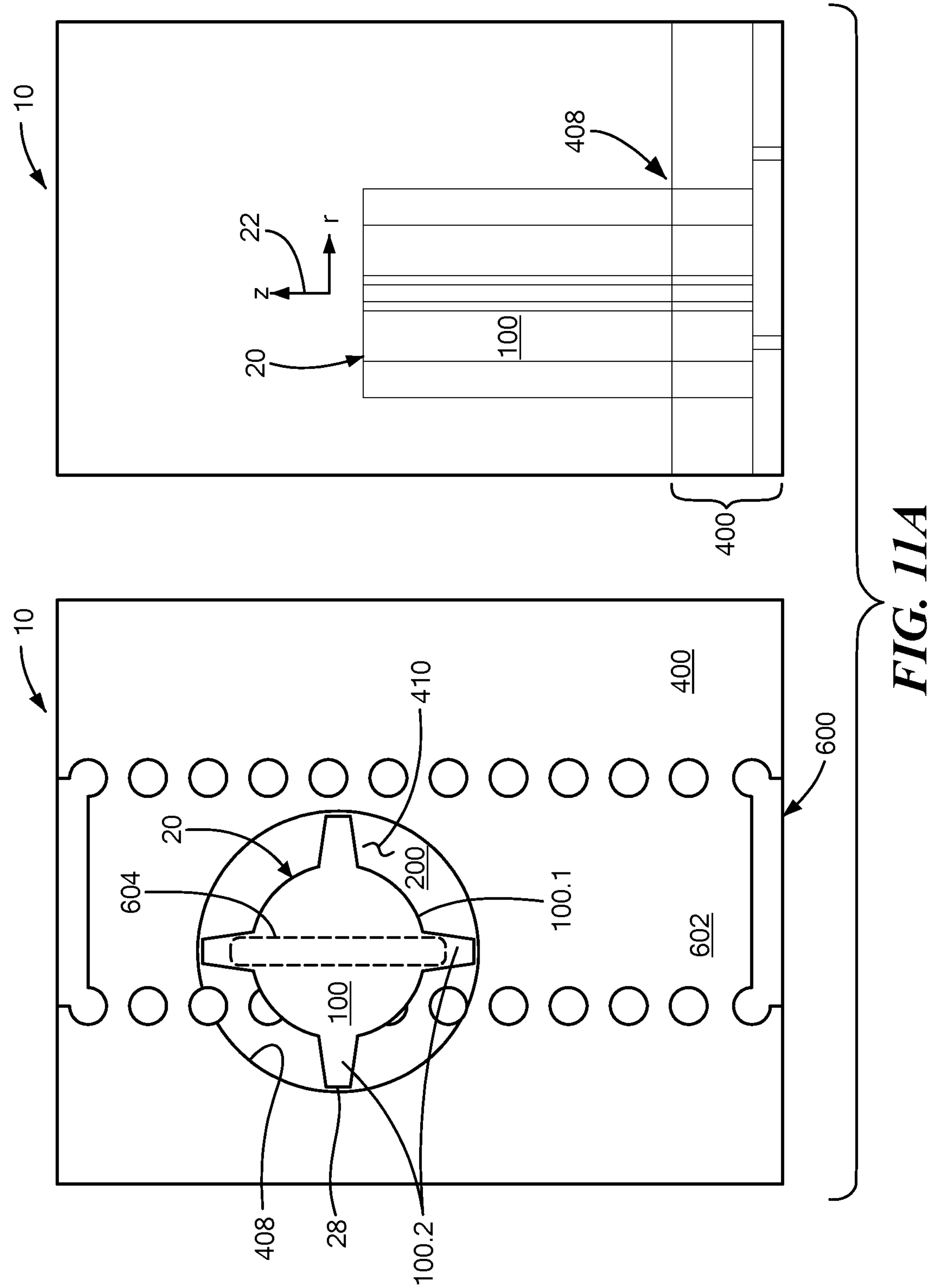
FIG. 11A depicts a transparent plan view and a corresponding transparent side elevation view of an EM device alternative to that depicted in FIGS. 8A and 8B and with a plurality of side projections, in accordance with an embodiment.
Figure 11B:
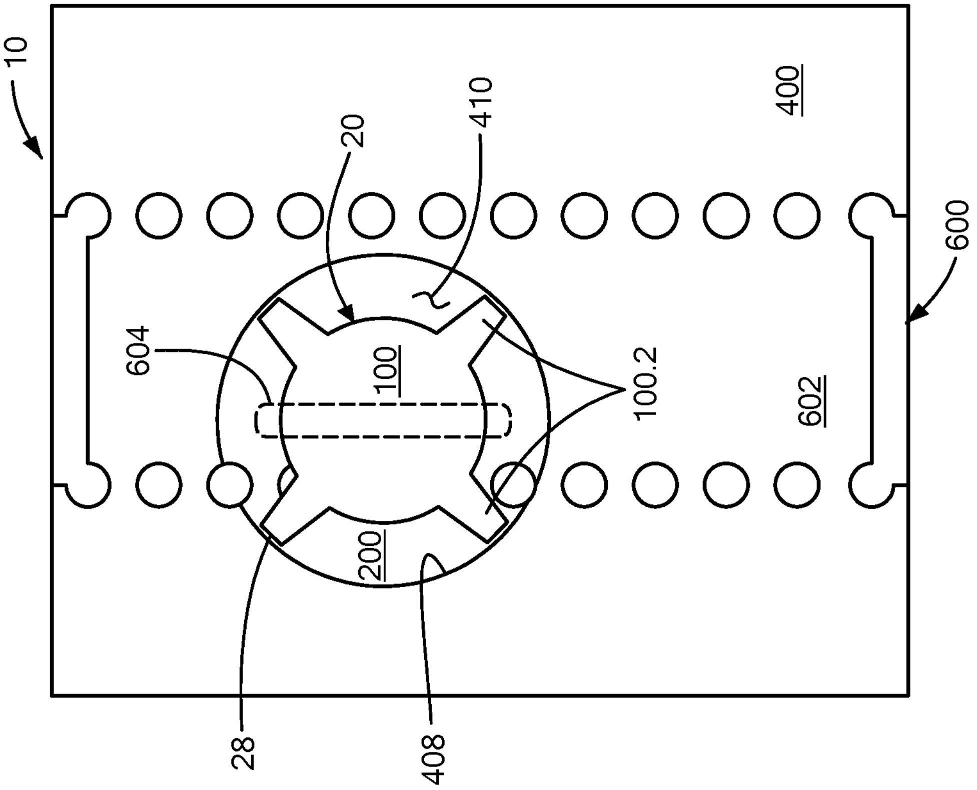
FIG. 11B depicts a transparent side elevation view of an EM device similar to that depicted in FIG. 11A but with the 3D body rotated slightly counterclockwise with respect to the z-axis, in accordance with an embodiment.
Figure 12:
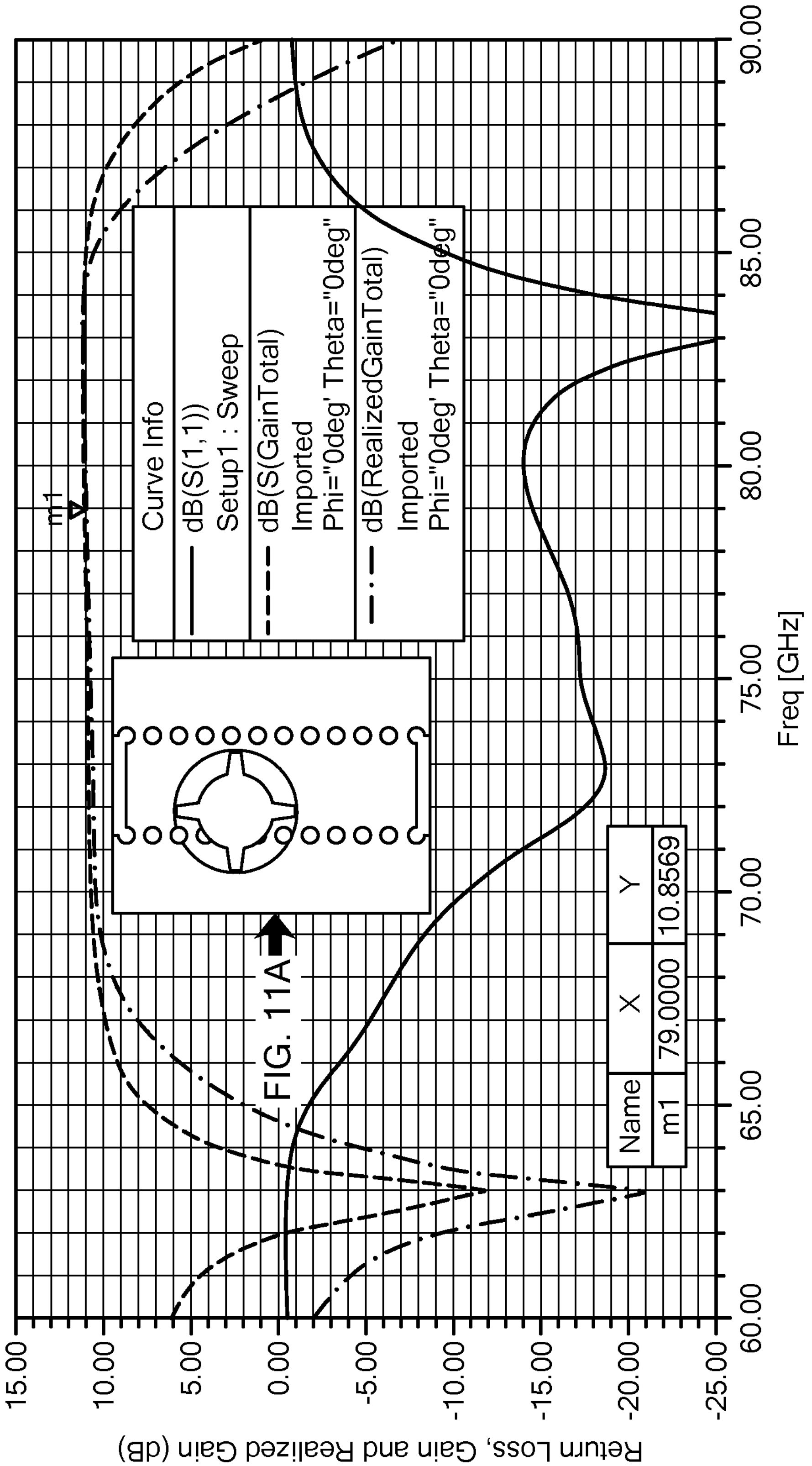
FIGS. 12 and 13 depict EM performance characteristics of the EM devices of FIGS. 11A and 11B, respectively, in accordance with an embodiment.
Figure 13:
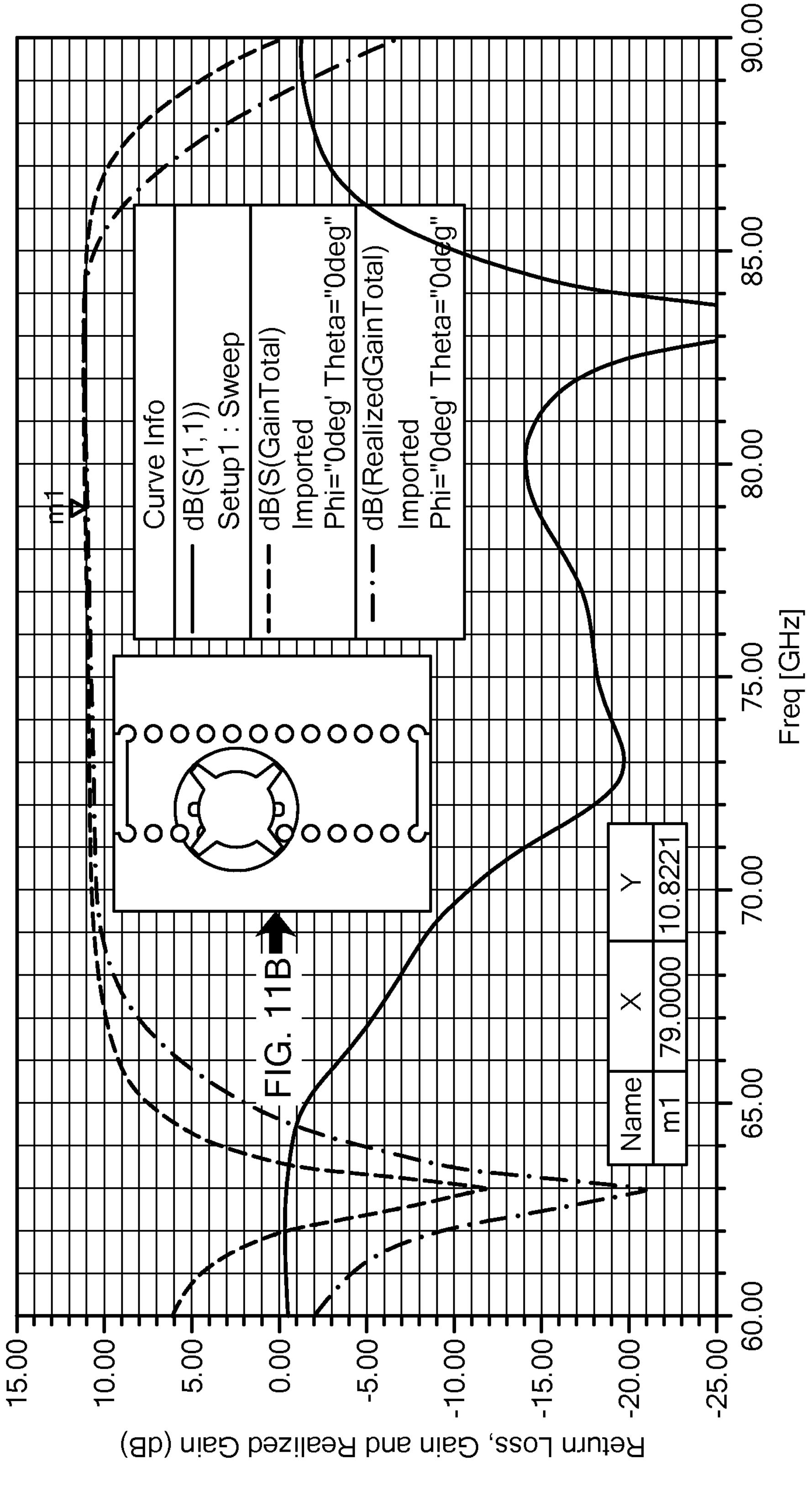
Figure 14A:
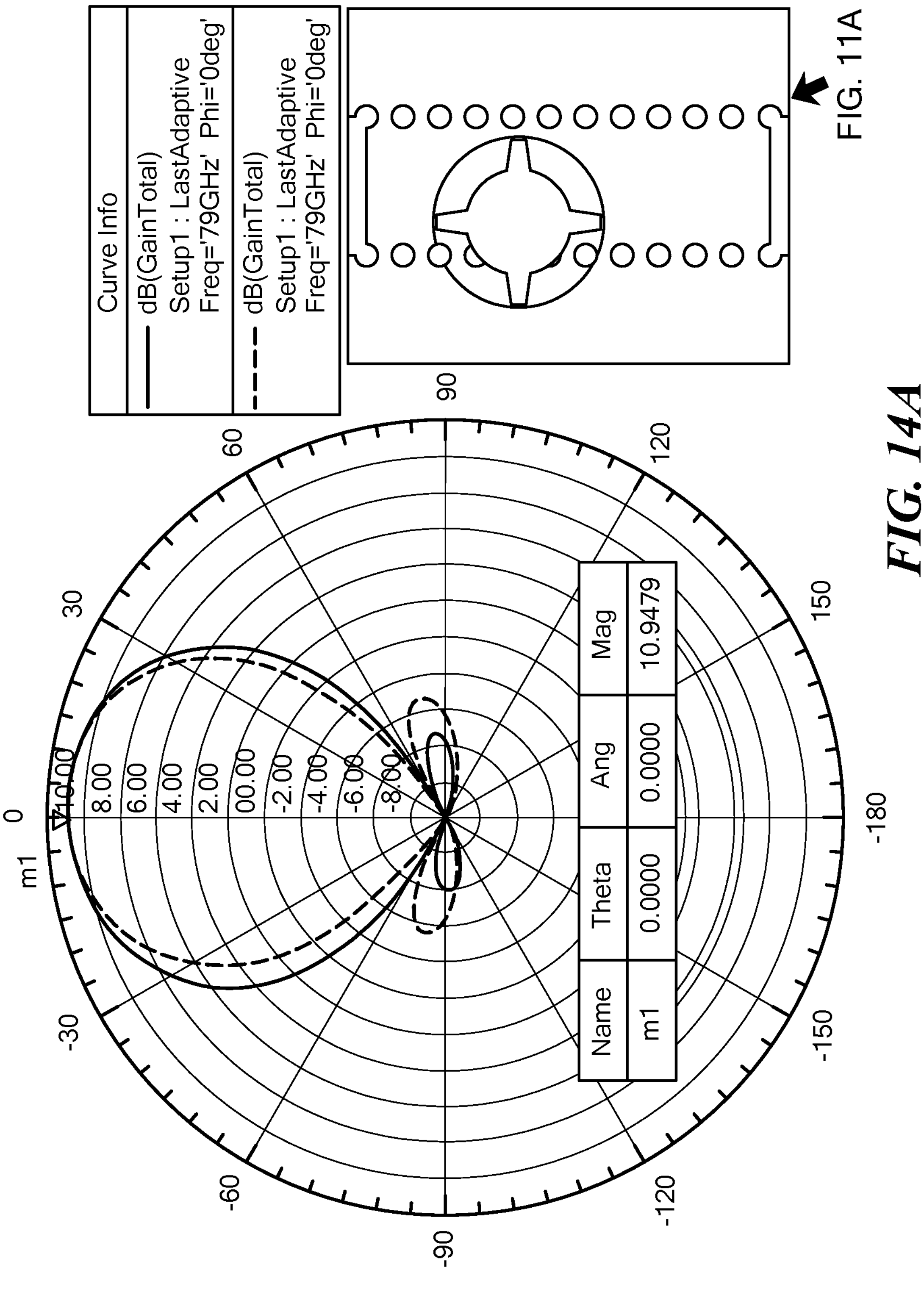
FIGS. 14A and 14B depict additional EM performance characteristics of the EM devices of FIGS. 11A and 11B, respectively, in accordance with an embodiment.
Figure 14B:
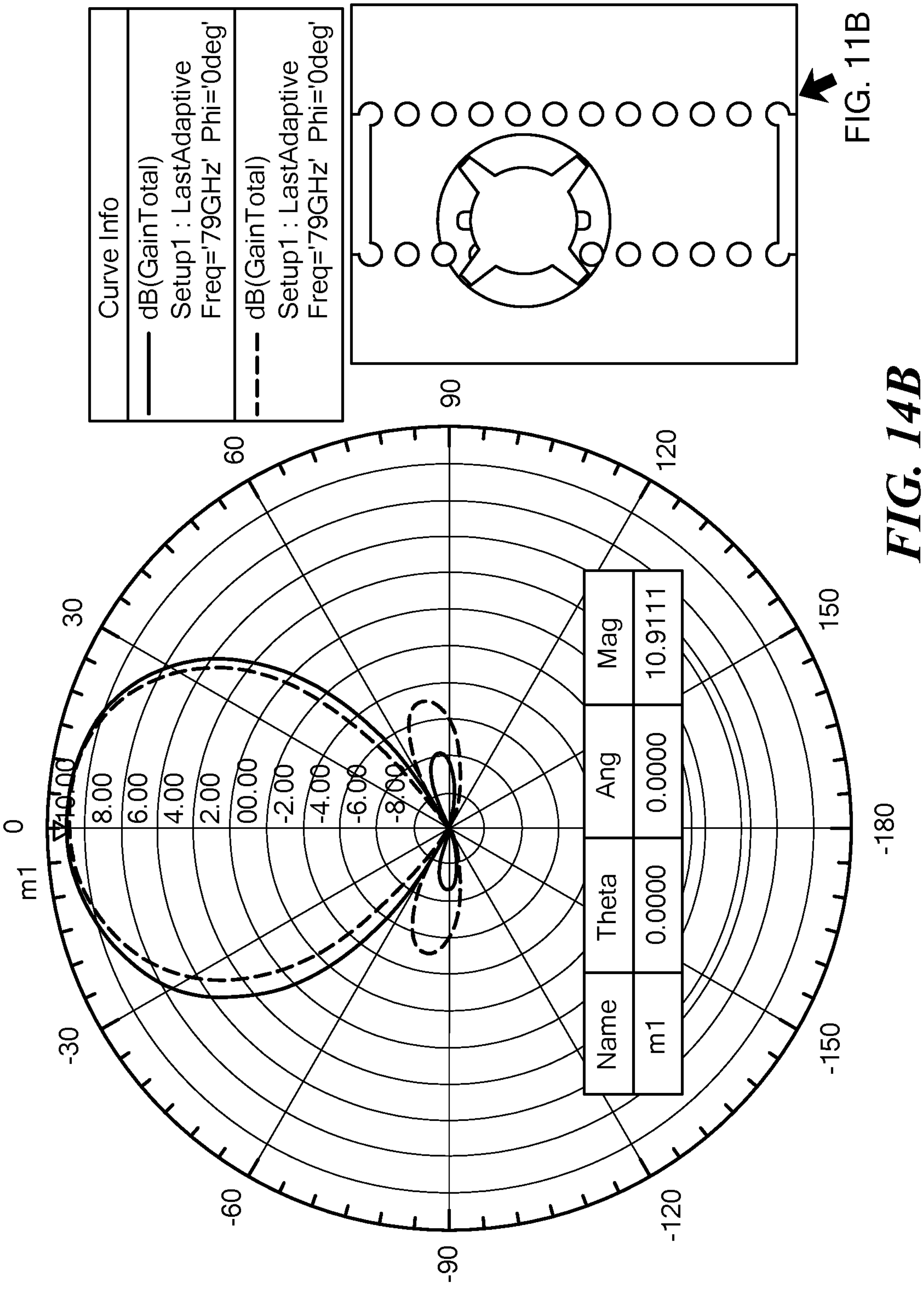
Figure 15A:
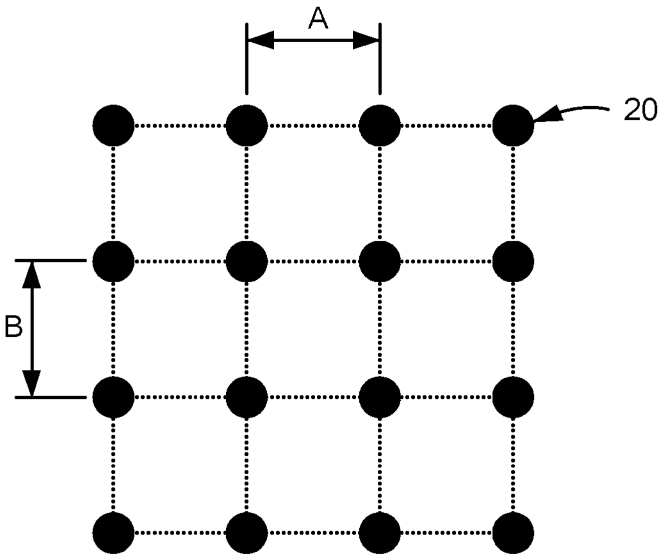
FIGS. 15A, 15B, 15C, 15D, 15E, 15F and 15G, depict alternative array structures that may be suitable for use with a 3D body as disclosed herein, in accordance with an embodiment.
Figure 15B:
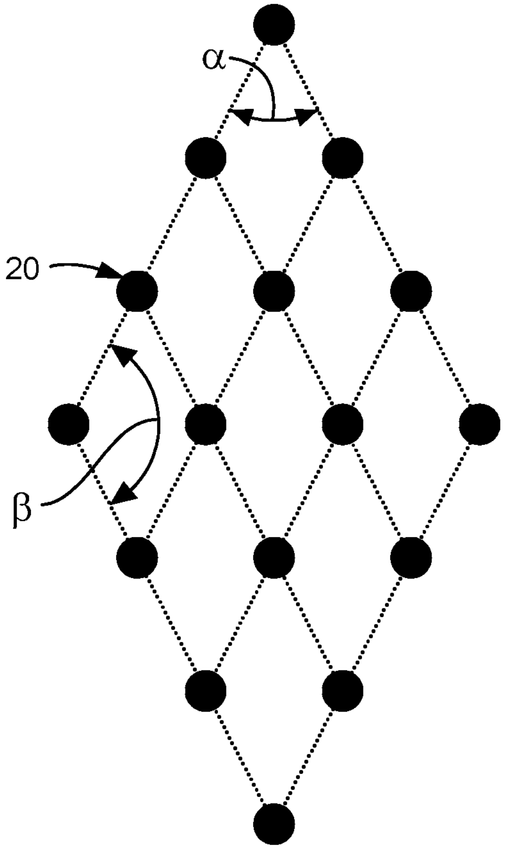
Figure 15C:
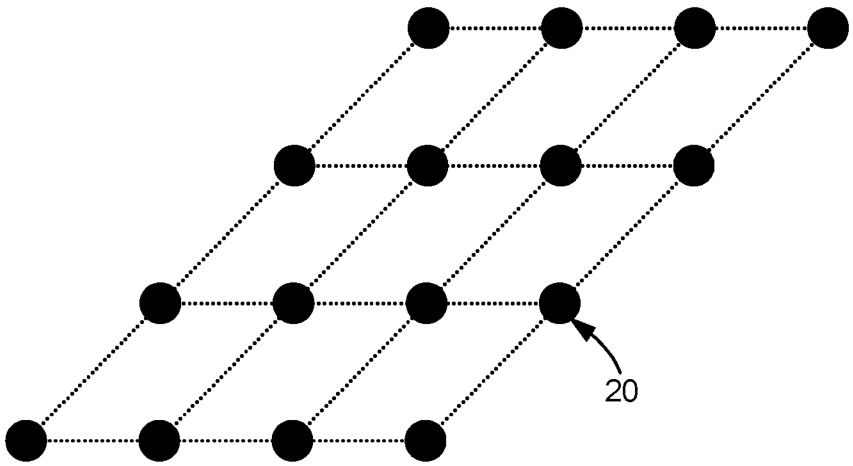
Figure 15D:
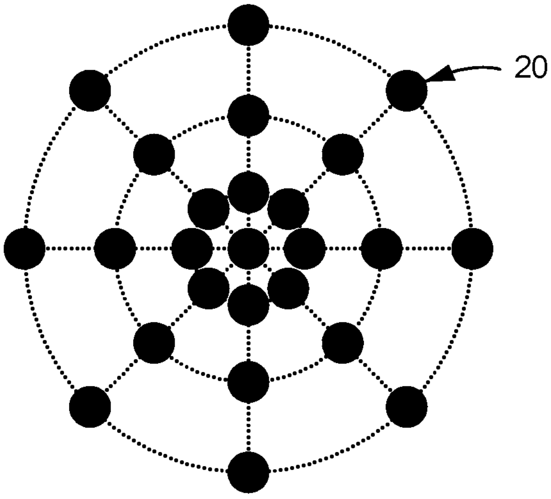
Figure 15E:
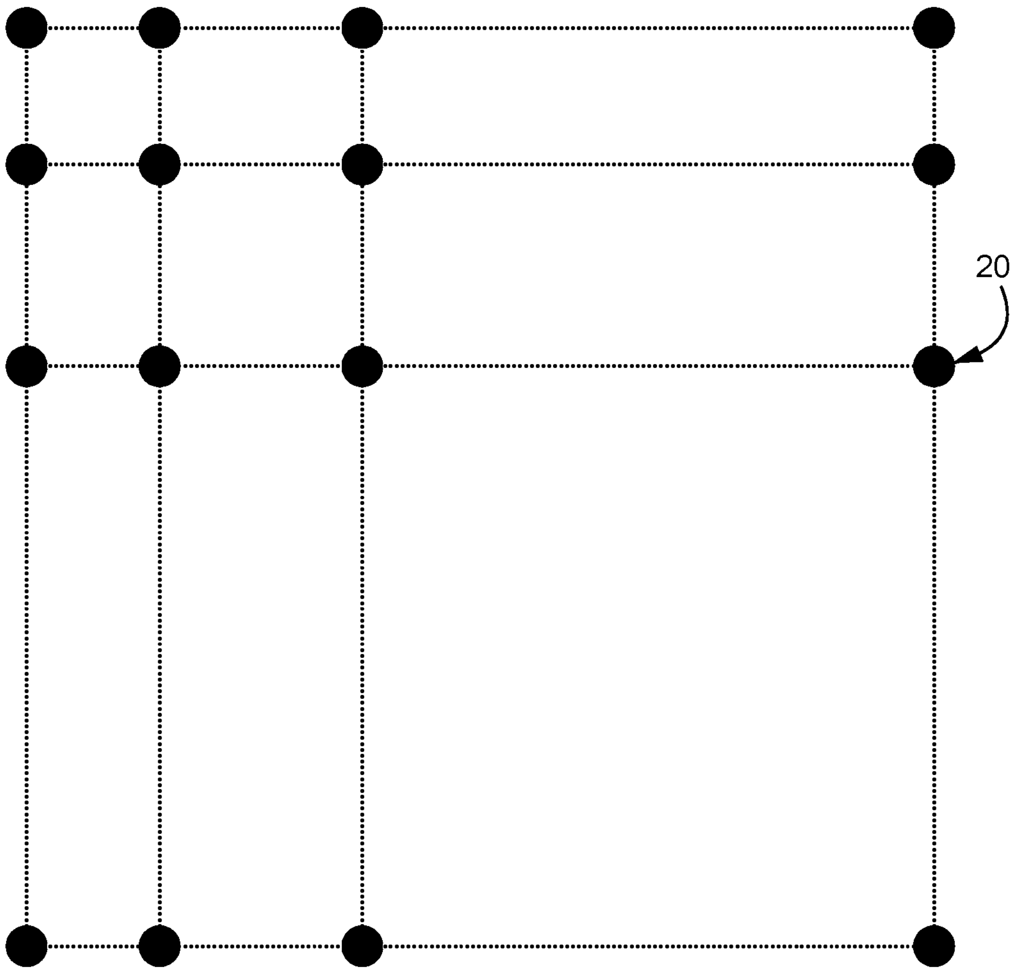
Figure 15F:
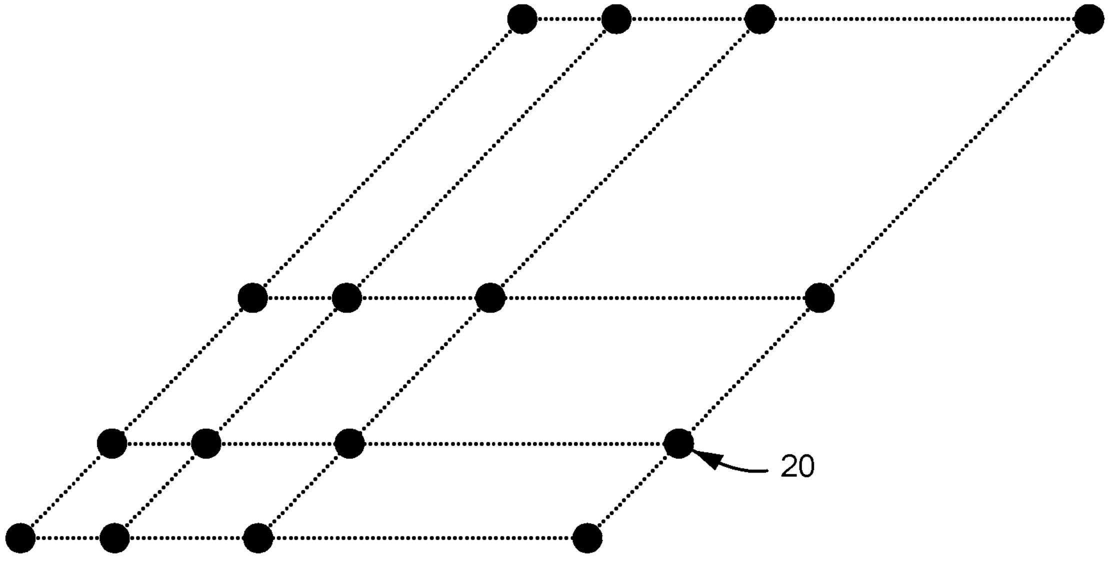
Figure 15G:
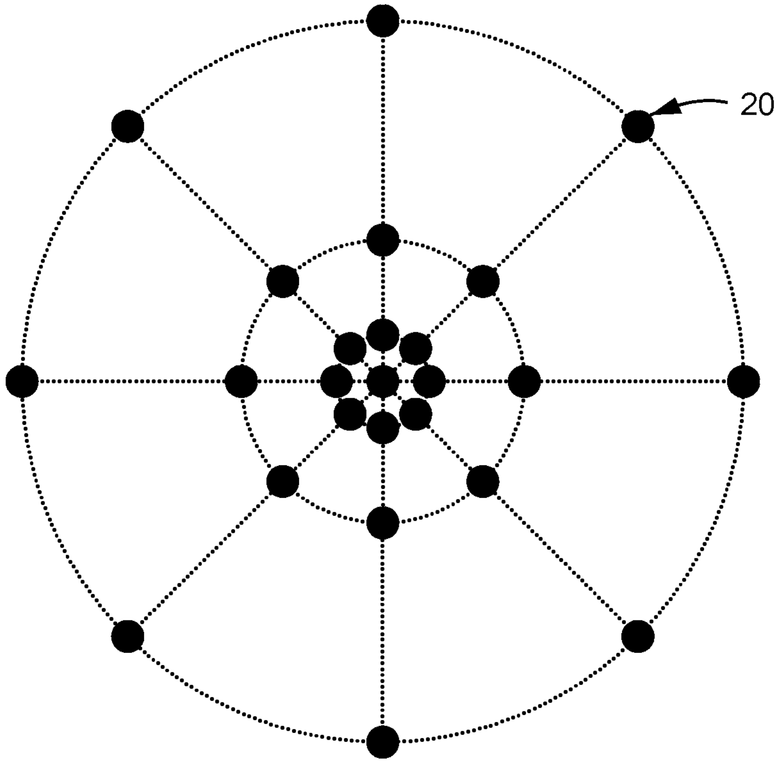

Reference is now made to FIGS. 11A and 11B that depict an EM device 10 having a 3D body 20 with at least a 1DP 100, where a cross-section profile of the 1DP 100 perpendicular to the particular linear axis 22 (depicted as the z-axis in FIGS. 11A, 11B) comprises a cylindrical central body 100.1 and a plurality of integrally formed radial projections (spacers) 100.2 that each extend radially outward to an outer surface 28 of the 3D body 20. In an embodiment, the plurality of radial projections 100.2 comprise four radial projections equally spaced apart from each other around a perimeter of the 3D body 20. In an embodiment, the 1DP 100 (cylindrical central body 100.1 and radial projections 100.2) is an extrusion along the particular linear axis 22. As depicted in FIGS. 11A and 11B, the 3D body 20 is assembled to a substrate 400 having an EM signal feed 600 in the form of a SIW 602 with an elongated coupling slot 604. The substrate 400 has a pocket 408 in which the 3D body 20 is assembled where the plurality of radial projections 100.2, and in particular the four illustrated radial projections 100.2, are disposed in an interference fit condition with walls the pocket 408. Here, the plurality of radial projections 100.2 form spacers to centrally locate the cylindrical central body 100.1 of the 3D body 20 in the pocket 408 in an interference fit condition. In an embodiment the 3D body 20 is composed of only the 1DP 100, and in an alternative embodiment the 3D body 20 includes a 2DP 200 that occupies the regions 410 between the plurality of radial projections 100.2 in a manner that mimics the outer profile of the pocket 408. In an embodiment, the 1DP 100 forms a dielectric resonator.

In the embodiment depicted in FIG. 11A, at least one of the plurality of radial projections 100.2 extends in a direction that is either parallel with or orthogonal to a length direction of the elongated coupling slot 604 of the SIW 602. Alternatively, in the embodiment depicted in FIG. 11B, at least one of the plurality of radial projections 100.2 extends in a direction that is neither parallel with nor orthogonal to a length direction of the elongated coupling slot 604 of the SIW 602. In an embodiment, the 3D body 100 of FIG. 11B is rotated about 40-degrees counterclockwise with respect to the z-axis as compared to the 3D body 100 of FIG. 11A.

Reference is now made to FIGS. 12, 13, 14A and 14B that depict various analytically modelled operating characteristics of the EM device 10 of FIGS. 11A and 11B as denoted (compare to the analytically modelled operating characteristics depicted in FIGS. 9-10). As can be seen by comparing the performance characteristics of FIGS. 12 and 13, and FIGS. 14A and 14B, the EM performance of the EM devices 10 of FIGS. 11A and 11B is relatively independent of the rotational orientation of the 3D body 20 relative to the z-axis.

From the foregoing it will be appreciated that an embodiment includes an arrangement where: the planar cross-section profile 102, 202 that is perpendicular and constant along a particular linear axis 22 of the 3D body 20 is a y-z planar cross-section profile that is perpendicular to and constant along an x-axis of an orthogonal x-y-z coordinate system of the 3D body 20 (see FIGS. 1A-1C for example); or, the planar cross-section profile 102, 202 that is perpendicular and constant along a particular linear axis 22 of the 3D body 20 is an r-θ planar cross-section profile that is perpendicular to and constant along a z-axis of a cylindrical r-θ-z coordinate system of the 3D body (See FIGS. 6A-6D for example).

From the foregoing it will be appreciated that an embodiment also includes any one of the following discrete constructs.

Construct-1: An EM device 10 having a 3D body 20 comprising a dielectric material, the 3D body 20 having a 1DP 100 and a 2DP 200 the 2DP 200 being disposed on top of the 1DP 100 relative to a z-axis of an orthogonal x-y-z coordinate system, wherein the 3D body 20 has a y-z plane cross-section profile that is perpendicular and constant along the x-axis of the 3D body 20 (see FIGS. 1A-1C for example).

Construct-2: An EM device 10 having a 3D body 20 comprising a dielectric material, the 3D body 20 having a 1DP 100 and a 2DP 200, the 2DP 200 being disposed radially outboard of the 1DP 100 relative to a radius r of a cylindrical r-θ-z coordinate system, wherein the 3D body 20 has an r-θ plane cross-section profile that is perpendicular and constant along the z-axis of the 3D body (see FIGS. 6A-6D for example).

While the foregoing description of an EM device 10 is made with reference to a single 3D body 20, it will be appreciated that any EM device 10 described herein may be configured with a plurality of the 3D bodies 20 arranged in an array in any pattern suitable for a purpose disclosed herein, which will now be described with reference to FIGS. 15A-15G. For example, a plurality of the dielectric 3D bodies 20 may be arranged in an array with a center-to-center spacing between neighboring 3D bodies 20 in accordance with any of the following arrangements: equally spaced apart relative to each other in an x-y grid formation, where A=B (see FIG. 15A, for example); spaced apart in a diamond formation where the diamond shape of the diamond formation has opposing internal angles α<90-degrees and opposing internal angles β>90-degrees (see FIG. 15B, for example); spaced apart relative to each other in a uniform periodic pattern (see FIGS. 15A, 15B, 15C, 15D, for example); spaced apart relative to each other in an increasing or decreasing non-periodic pattern (see FIGS. 15E, 15F, 15G, for example); spaced apart relative to each other on an oblique grid in a uniform periodic pattern (see FIG. 15C, for example); spaced apart relative to each other on a radial grid in a uniform periodic pattern (see FIG. 15D, for example); spaced apart relative to each other on an x-y grid in an increasing or decreasing non-periodic pattern (see FIG. 15E, for example); spaced apart relative to each other on an oblique grid in an increasing or decreasing non-periodic pattern (see FIG. 15F, for example); spaced apart relative to each other on a radial grid in an increasing or decreasing non-periodic pattern (see FIG. 15G, for example); spaced apart relative to each other on a non-x-y grid in a uniform periodic pattern (see FIGS. 15B, 15C, 15D, for example); spaced apart relative to each other on a non-x-y grid in an increasing or decreasing non-periodic pattern (see FIGS. 15F, 15G, for example). While various arrangements of the plurality of 3D bodies 20 are depicted herein, via FIGS. 15A-15G for example, it will be appreciated that such depicted arrangements are not exhaustive of the many arrangements that may be configured consistent with a purpose disclosed herein. As such, any and all arrangements of the plurality of 3D bodies 20 disclosed herein for a purpose disclosed herein are contemplated and considered to be within the ambit of the disclosure disclosed herein. In an embodiment, each 3D body 20 relative to each other 3D body 20 within an array is disposed at a center to center pitch spacing of equal to or less than λ/2, where λ is an operating wavelength of the EM device. In an embodiment, each 3D body 20 is configured to resonate at a frequency of equal to or greater than 7 GHz and equal to or less than 300 GHz, particularly equal to or greater than 8 GHz and equal to or less than 12 GHz (or X-band frequency range), further particularly equal to or greater than 10 GHz and equal to or less than 15 GHz (or Low Earth Orbit, LEO, frequency range), further particularly equal to or greater than 12 GHz and equal to or less than 18 GHz (or Ku frequency range), further particularly equal to or greater than 18 GHz and equal to or less than 26.5 GHz (or K-band frequency range); further particularly equal to or greater than 26.5 GHz and equal to or less than 40 GHZ (or Ka frequency range), further particularly equal to or greater than 40 GHz and equal to or less than 75 GHz (or V-band frequency range); further particularly equal to or greater than 75 GHz and equal to or less than 110 GHz (or W-band frequency range).

Figure 16A:
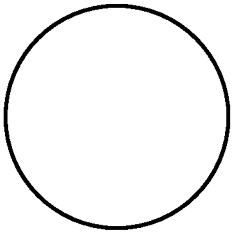
FIGS. 16A, 16B, 16C, 16D, 16E, 16F and 16G, depict alternative two dimensional, 2D, cross-section profiles of an extrusion that may be suitable for making a 3D body as disclosed herein, in accordance with an embodiment.
Figure 16B:
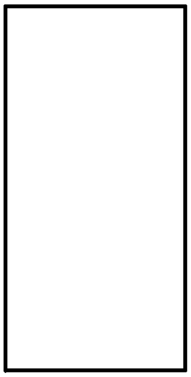
Figure 16C:
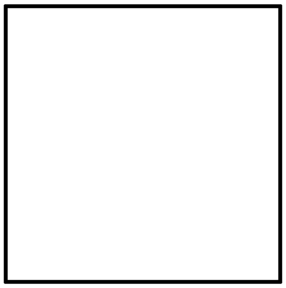
Figure 16D:
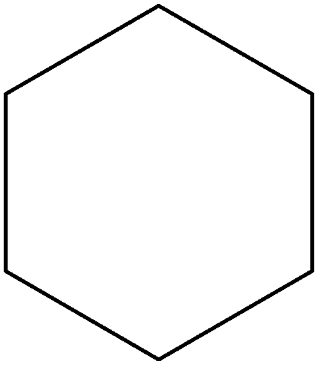
Figure 16E:
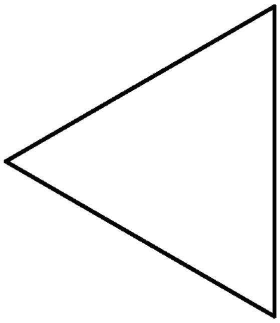
Figure 16F:
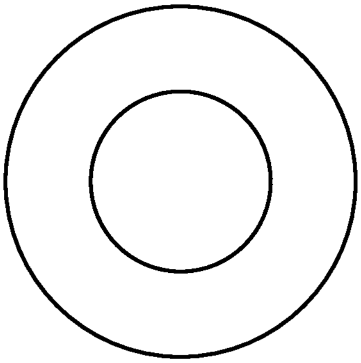
Figure 16G:
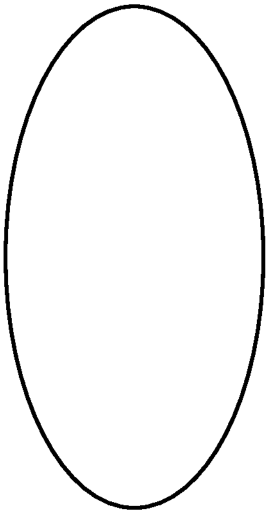

While the foregoing description of a 3D body 20 refers to or describes a 2D extrusion cross section shape for the 1DP 100 and/or the 2DP 200 along the particular linear axis 22 (x-axis in FIGS. 1A-1C, and z-axis in FIGS. 6A-6D, for example), it will be appreciated that an embodiment is not so limited and may include any 2D cross sectional shape suitable for a purpose disclosed herein. For example and with reference to FIGS. 16A-16G, an embodiment of the 3D body 20 includes and arrangement where the extrusion shape of the 1DP 100, the 2DP 200, or both the 1DP 100 and the 2DP 200, has a 2D cross-section profile perpendicular to the particular linear axis 22 that has the shape of: a circle FIG. 16A, a polygon FIGS. 16B-16E, a rectangle FIGS. 16B and 16C, a square FIG. 16C, an octogen FIG. 16D, a triangle FIG. 16E, a ring FIG. 16F, an ellipse 16G, or any other 2D shape suitable for a purpose disclosed herein.

With respect to any of the foregoing EM devices 10, an embodiment includes an arrangement where at least one of the 1DP 100, the 2DP 200, and the 3DP 300 is made from a ceramic or pure ceramic material. Alternatively, at least one of the 1DP 100, the 2DP 200 and the 3DP 300, is made from a ceramic-filled polymer material.

Figure 17B:
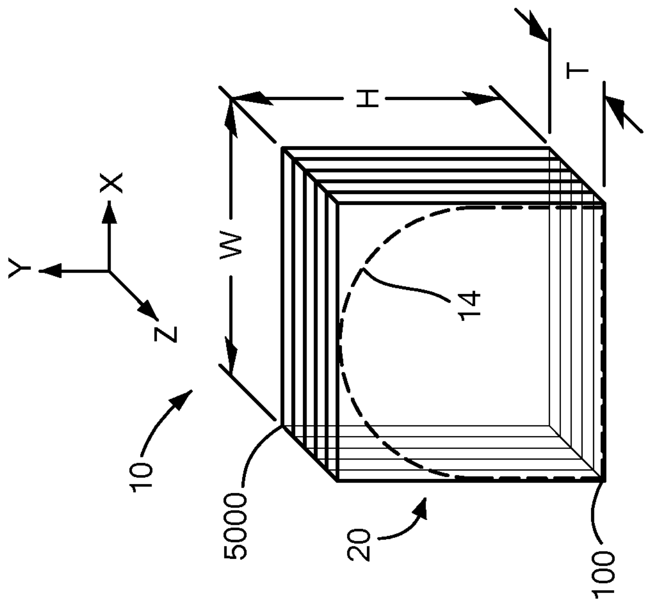
FIGS. 17B, 17C and 17D, depict a 3D body cut from the 3D construct of FIG. 17A, in accordance with an embodiment.
Figure 17A:
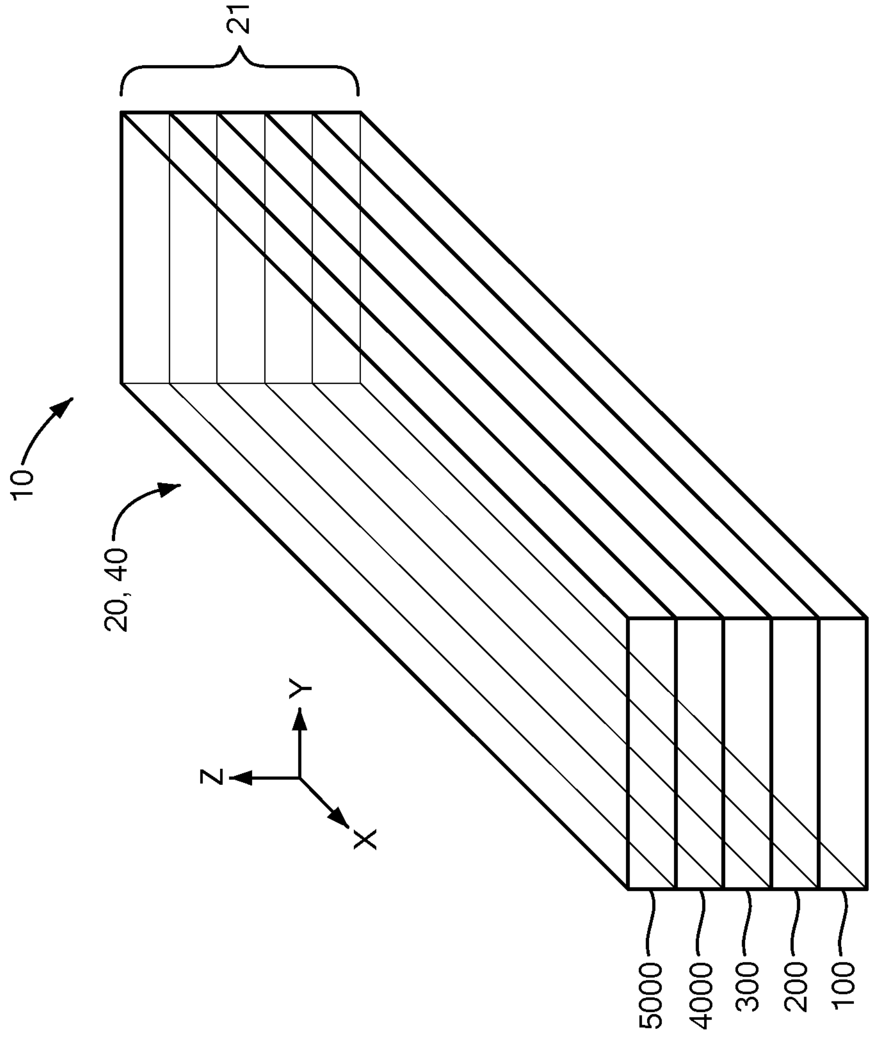
FIG. 17A depicts a 3D construct or a 3D body composed of a plurality of layers, in accordance with an embodiment.

While the foregoing description of an EM device 10 having a 3D body 20 has been directed to a 1DP 100, a 2DP 200, and optionally a 3DP 300, having an extruded 2D cross-section shape having a defined form such as those depicted in FIGS. 1A-1C, 2A-2B, 3A, 3C, 4, 6A-6D, 7A-7C, 8A-8B, 11A-11B, and 16A-16G, it will be appreciated that an embodiment is not so limited and may encompass a construct composed of a plurality of layers 21 either laminated or extruded, which will now be described with reference to FIGS. 17A, 17B, 17C and 17D, where each embodiment depicts a total of five dielectric portions, 1DP 100, 2DP 200, 3DP 300, 4DP 4000 and 5DP 5000, but are not limited to any particular number thereof. FIG. 17A may be viewed as either a 3D body 20, or as a 3D construct 40 (see FIG. 4 for example) that is cut, severed or otherwise segmented, into one of the 3D bodies of FIG. 17B, 17C or 17D for example. For clarity, FIGS. 17B-17D enumerate only the 1DP 100 and the 5DP 5000, but will be understood to include all five dielectric portions as enumerated in FIG. 17A. As can be seen by illustration of the associated x-y-z coordinate systems, each embodiment of FIGS. 17A-17D has the plurality of layers 21 stacked or layered relative to each other in a direction along the associated z-axis. In an embodiment and as depicted in FIGS. 17A-17D, the 3D construct 40 and/or the 3D body 20 is an extrusion, or has an extrusion construct, along the x-axis.

Figure 17C:
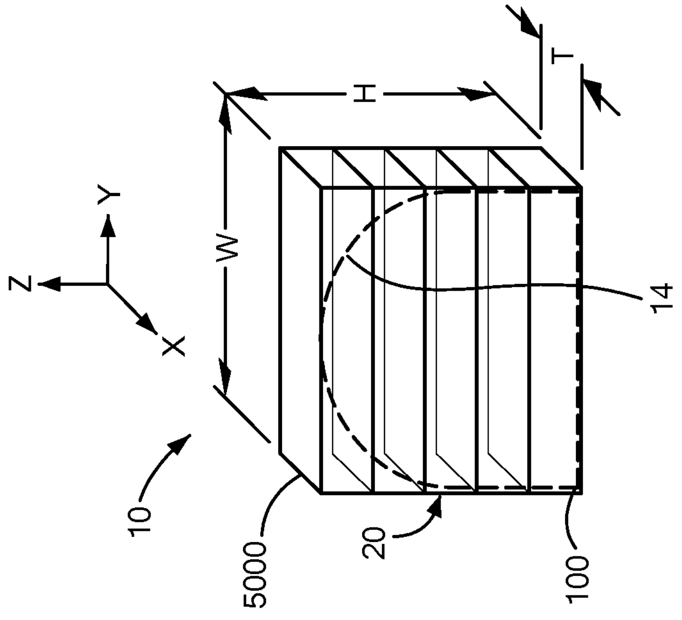
Figure 17D:
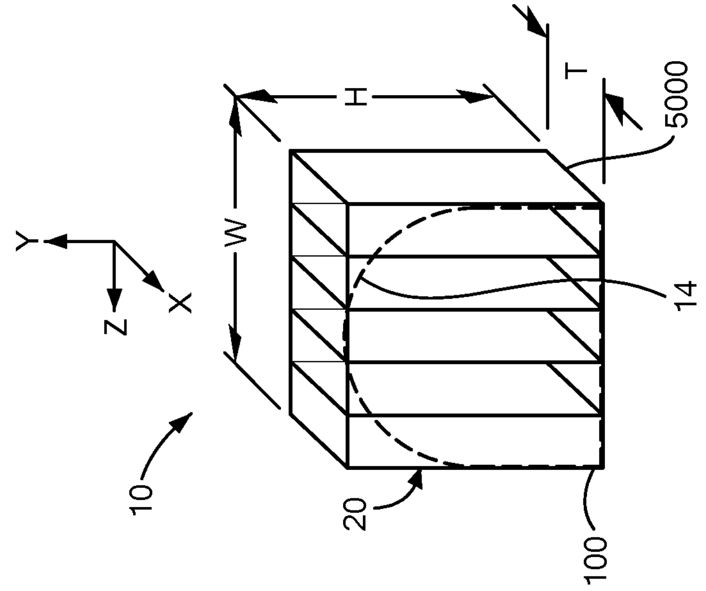

With particular reference to FIGS. 17B-17D, an embodiment includes an EM device 10 having a 3D body 20 comprising a plurality of layers 21 of dielectric materials, each layer of the plurality of layers 21 being disposed adjacent and in contact with, or in direct contact with, another one of the plurality of layers 21, each layer of the plurality of layers 21 being disposed parallel to an x-y plane of a corresponding orthogonal x-y-z coordinate system and being stacked relative to each other along the associated z-axis, wherein each layer of the plurality of layers 21 comprises a dielectric material other than air, wherein each layer of the plurality of layers 21 has a planar cross-section profile perpendicular to at least one of the x-axis and/or the y-axis that is constant along the associated x-axis or y-axis, wherein the 3D body 20 has a 3D shape having an overall height dimension H, an overall width dimension W, and an overall thickness dimension T, a front profile view of the 3D body 20 being defined by the dimensions H and W, and wherein at least one layer of the plurality of layers 21 comprises a dielectric resonator, DR. In an embodiment, the 3D shape of the 3D body 20 may be defined by square cut edges of the 3D construct 40, or may be defined by a cutting die that forms a particular shape as depicted by dashed lines 14. While dashed lines 14 depict a particular dome shaped form of the 3D body 20, it will be appreciated that any form suitable for a purpose disclosed herein may be created by a suitably shape cutting die.

In the embodiment of FIG. 17B, the lamination edges of the plurality of layers 21 are not visible in the front profile view, while in the embodiments of FIGS. 17C-17D the lamination edges of the plurality of layers 21 are visible in the front profile view. In the embodiment of FIG. 17D, the lamination edges of the plurality of layers 21 are not visible in the side profile view (x-y plane of FIG. 17D).

In the embodiment of FIG. 17B, each layer of the plurality of layers 21 is stacked relative to each other across the thickness T from a front face of the 3D body 20 to an opposing back face of the 3D body 20. In the embodiment of FIG. 17C, each layer of the plurality of layers 21 is stacked relative to each other across the height H from a bottom of the 3D body 20 to an opposing top of the 3D body 20. In the embodiment of FIG. 17D, each layer of the plurality of layers 21 is stacked relative to each other across the width W from one side of the 3D body 20 to an opposing side of the 3D body 20.

In any of the embodiments of FIGS. 17A-17D: the dielectric material of each layer of the plurality of layers 21 has a different dielectric constant than an adjacent layer; the dielectric material of at least one layer of the plurality of layers 21 is homogeneous; the dielectric material of at least one layer of the plurality of layers 21 comprises air; at least one layer of the plurality of layers 21 is made from a ceramic or pure ceramic material; and/or, at least one layer of the plurality of layers 21 is made from a ceramic-filled polymer material.

In any of the embodiments of FIGS. 17A-17D, the dielectric material of each layer of the plurality of layers 21 has an average dielectric constant that varies from a relative high value to a relative low value from an inner layer toward an outer layer of the 3D body 20. Alternatively, the dielectric material of each layer of the plurality of layers 21 has an average dielectric constant that varies from a relative high value to a relative low value from an inner layer toward opposing outer layers of the 3D body 20. Alternatively, the dielectric material of each layer of the plurality of layers 21 has an average dielectric constant that varies from a relative high value to a relative low value from a centrally disposed inner layer toward opposing outer layers of the 3D body 20. Alternatively, the dielectric material of each layer of the plurality of layers 21 has an average dielectric constant that varies from a relative low value to a relative high value from an inner layer toward an outer layer of the 3D body 20. Alternatively, the dielectric material of each layer of the plurality of layers 21 has an average dielectric constant that varies from a relative low value to a relative high value from an inner layer toward opposing outer layers of the 3D body 20. Alternatively, the dielectric material of each layer of the plurality of layers 21 has an average dielectric constant that varies from a relative low value to a relative high value from a centrally disposed inner layer toward opposing outer layers of the 3D body 20.

In the embodiment of FIG. 17C, the dielectric material of each layer of the plurality of layers 21 has an average dielectric constant that varies from a relative high value to a relative low value from a bottom layer toward a top layer of the 3D body 20. Alternatively, the dielectric material of each layer of the plurality of layers 21 has an average dielectric constant that varies from a relative low value to a relative high value from a bottom layer toward a top layer of the 3D body 20.

While certain combinations of individual features have been described and illustrated herein, it will be appreciated that these certain combinations of features are for illustration purposes only and that any combination of any of such individual features may be employed in accordance with an embodiment, whether or not such combination is explicitly illustrated, and consistent with the disclosure herein. Any and all such combinations of features as disclosed herein are contemplated herein, are considered to be within the understanding of one skilled in the art when considering the application as a whole, and are considered to be within the scope of the invention disclosed herein, as long as they fall within the scope of the invention defined by the appended claims, in a manner that would be understood by one skilled in the art.

While an invention has been described herein with reference to example embodiments, it will be understood by those skilled in the art that various changes may be made and equivalents may be substituted for elements thereof without departing from the scope of the claims. Many modifications may be made to adapt a particular situation or material to the teachings of the invention without departing from the essential scope thereof. Therefore, it is intended that the invention not be limited to the particular embodiment or embodiments disclosed herein as the best or only mode contemplated for carrying out this invention, but that the invention will include all embodiments falling within the scope of the appended claims. In the drawings and the description, there have been disclosed example embodiments and, although specific terms and/or dimensions may have been employed, they are unless otherwise stated used in a generic, exemplary and/or descriptive sense only and not for purposes of limitation, the scope of the claims therefore not being so limited. When an element such as a layer, film, region, substrate, or other described feature is referred to as being "on", "in contact with", or in "engagement with", another element, it can be directly on, in contact with, or engaged with the other element, or intervening elements may also be present. In contrast, when an element is referred to as being "directly on", "directly in contact with", or "directly engaged with" another element, there are no intervening elements present. The use of the terms first, second, etc. do not denote any order or importance, but rather the terms first, second, etc. are used to distinguish one element from another. The use of the terms a, an, etc. do not denote a limitation of quantity, but rather denote the presence of at least one of the referenced item. The term "comprising" as used herein does not exclude the possible inclusion of one or more additional features. And, any background information provided herein is provided to reveal information believed by the applicant to be of possible relevance to the invention disclosed herein. No admission is necessarily intended, nor should be construed, that any of such background information constitutes prior art against an embodiment of the invention disclosed herein.

The invention claimed is:

1. An electromagnetic, EM, device, comprising:

a three-dimensional, 3D, body comprising a dielectric material, the 3D body having a first dielectric portion, 1DP, and a second dielectric portion, 2DP, wherein the 1DP is at least partially but not completely embedded within the 2DP;

wherein the 1DP and the 2DP each comprise a dielectric material other than air;

wherein the 1DP and the 2DP each have a planar cross-section profile perpendicular to a particular linear axis of the 3D body that is constant along the particular linear axis;

wherein the first dielectric portion, 1DP, of the 3D body comprises a dielectric resonator, DR; and wherein the 3D body has a first planar end and an opposing second planar end, the first and second planar ends having a cross-section, perpendicular to the particular linear axis of the 3D body, with an outside profile of the 3D body at an outer periphery of each of the first and second planar ends that comprises both the 1DP and the 2DP.

2. The EM device of claim 1, wherein:

the 3D body is an extrusion along the particular linear axis.

3. The EM device of claim 1, wherein:

the second planar end is parallel with the first planar end.

4. The EM device of claim 1, wherein:

at least one of the first planar end and the second planar end is perpendicular to the particular linear axis.

5. The EM device of claim 1, wherein:

one or both of the first planar end and the second planar end has an outside 2D profile comprising any one of the following shapes: a complete or partial circle; a complete or partial ellipse; a complete or partial square; a complete or partial rectangle; a complete or partial triangle; a complete or partial pentagon; a complete or partial hexagon; a complete or partial octagon; a complete or partial parallelogram; a complete or partial trapezoid; a bowtie shape; or, a combination of any of the foregoing shapes.

6. The EM device of claim 1, wherein:

the first and second planar ends of 1DP has the same or a similar 2D shape as the first and second planar ends of the 2DP.

7. The EM device of claim 1, wherein:

the first and second planar ends of 1DP has a different or a dissimilar 2D shape as the first and second planar ends of the 2DP.

8. The EM device of claim 1, wherein:

the 1DP comprises a first dielectric material having a first average dielectric constant, 1Dk, and the 2DP comprises a second dielectric material having a second average dielectric constant, 2Dk, wherein the 2Dk is different from the 1Dk.

9. The EM device of claim 1, wherein:

the 3D body further comprises at least a third dielectric portion, 3DP, the 2DP being at least partially but not completely embedded within the 3DP, the 3DP having a planar cross-section profile perpendicular to the particular linear axis of the 3D body that is constant along the particular linear axis.

10. The EM device of claim 9, wherein:

the planar cross-section profile at a planar end of the 3D body along the particular linear axis comprises the 3DP.

11. The EM device of claim 1, wherein:

the 3D body has an overall height, H, in a direction parallel to the z-axis of either an orthogonal x-y-z coordinate system or a cylindrical r-θ-z coordinate system of the 3D body, and an overall maximum outside dimension, W, in a direction perpendicular to the z-axis, where H is greater than W.

12. The EM device of claim 1, wherein:

a cross-section profile of the 1DP perpendicular to the particular linear axis comprises a plurality of radial projections that extend radially outward to an outer surface of the 3D body.

13. The EM device of claim 1, wherein:

the 1DP comprises an extension portion that is seamlessly and integrally formed with a base portion of the 1DP, the extension portion having a planar cross-section profile along the particular linear axis and at a distance from the base portion that is identical to the planar cross-section profile of the 1DP.

14. The EM device of claim 1, wherein:

at least one of the 1DP and the 2DP is made from a ceramic or polymer-ceramic composite material.

15. The EM device of claim 1, further comprising:

a substrate, wherein the 3D body is disposed on the substrate.

16. The EM device of claim 1, wherein:

the dielectric material of the 3D body has a dielectric constant that is variant in two axial directions of an orthogonal x-y-z coordinate system.

17. An array comprising a plurality of the 3D body of claim 15, wherein:

each 3D body relative to each other 3D body is disposed at a center to center pitch spacing of equal to or less than λ/2, where λ is an operating wavelength of the EM device.

18. The EM device of claim 1, wherein:

the planar cross-section profile that is perpendicular and constant along a particular linear axis of the 3D body is a y-z planar cross-section profile that is perpendicular to and constant along an x-axis of an orthogonal x-y-z coordinate system of the 3D body.

19. The EM device of claim 1, wherein:

the planar cross-section profile that is perpendicular and constant along a particular linear axis of the 3D body is an r-θ planar cross-section profile that is perpendicular to and constant along a z-axis of a cylindrical r-θ-z coordinate system of the 3D body.

* * * * *